(12) United States Patent
Shichijyo et al.

(10) Patent No.: US 6,744,554 B2
(45) Date of Patent: Jun. 1, 2004

(54) WAVELENGTH CONVERSION APPARATUS

(75) Inventors: Shiro Shichijyo, Sodegaura (JP); Kazuhiro Yamada, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 276 days.

(21) Appl. No.: 09/950,558

(22) Filed: Sep. 11, 2001

(65) Prior Publication Data

US 2002/0063945 A1 May 30, 2002

(30) Foreign Application Priority Data

Sep. 11, 2000 (JP) ..................... P2000-275496

(51) Int. Cl.[7] .............................. G02F 2/02; G02F 1/35
(52) U.S. Cl. ....................................... 359/326; 359/483
(58) Field of Search ............................ 359/326–332, 359/483

(56) References Cited

U.S. PATENT DOCUMENTS

| | | | | |
|---|---|---|---|---|
| 4,684,828 A | * | 8/1987 | Sommargren | 359/326 |
| 5,400,164 A | * | 3/1995 | Kurtzke et al. | 359/326 X |
| 6,252,698 B1 | * | 6/2001 | Oikawa | 359/326 |

FOREIGN PATENT DOCUMENTS

| | | |
|---|---|---|
| EP | 1 139 160 A2 | 10/2001 |
| JP | 10-213826 A | 8/1998 |
| JP | 2000-10130 A | 1/2000 |

OTHER PUBLICATIONS

Chou, Ming–Hsien, et al., *IEICE Trans. Electron.*, "Optical Signal Processing and Switching with Second–Order Non-linearities in Waveguides," E83–C, No. 6, pp 869–874, Jun. 2000.

Brener et al., "Polarisation–insensitive wavelength converter based on cascaded nonlinearities in LiNbO3 waveguides," Electronics Letters, Jan. 6, 2000, pps 66–67, vol. 36, No. 1, IEE Stevenage, GB.

Chang, "Polarization–independent acousto–optic tunable filter for WDM applications," CLEO '97: Conference on Lasers and Electro–Optics, May 18, 1997, p. 207, IEEE, New York, Paper CWC5.

Giles et al., "Polarization–independent phase conjugation in a reflective optical mixer," IEEE Photonics Technology Letters, 1995, pps 126–128, vol. 7, No. 1, IEEE Inc., New York, Jan. 1995.

Martinelli, "A universal compensator for polarization changes induced by birefringence on a retracing beam," Optics Communications, Aug. 15, 1989, pps 341–344, vol. 72, No. 6, North–Holland Publishing Co., Amsterdam, NL.

* cited by examiner

*Primary Examiner*—John D. Lee
(74) *Attorney, Agent, or Firm*—Burns, Doane, Swecker & Mathis, LLP

(57) ABSTRACT

A wavelength conversion apparatus includes: multiplexer that multiplexes pumped light and signal light; wavelength conversion element that wavelength-converts linearly polarized light components in x direction with respect to the pumped light and the signal light, and generates output light polarized in x direction; and light circulator that allows the light of the multiplexer to be output to the wavelength conversion element and allow the light from the wavelength conversion element to be output to the port; reflecting mirror; and Faraday rotator that makes a polarization direction difference of 90 degrees between light traveling from the wavelength conversion element to the reflecting mirror and light reflected at the reflecting mirror so as to return to the wavelength conversion element. Intensity IL of the output light does not depend on the incident polarization angle $\phi$ of the signal light $\lambda s$ and is constant.

19 Claims, 7 Drawing Sheets

WAVELENGTH CONVERSION APPARATUS

BACKGROUND OF THE INVENTION

1. Field of the Invention

The present invention relates to a wavelength conversion apparatus capable of converting a wavelength of input light to another wavelength.

2. Description of the Related Art

In the field of communications using optical fibers, large-capacity and high-speed data transmission is required. Particularly, wavelength division multiplexing (WDM) and optical time division multiplexing (OTDM) are considered promising in that the transmission capacity of the optical fibers can be significantly increased, and a wavelength control technology for precisely controlling a plurality of carrier wavelengths and a wavelength conversion technology for converting a carrier wavelength to another carrier wavelength are important.

For example, in existing optical communication networks, single-wavelength optical transmission is mainstream that uses as the carrier wavelength the 1.3-μm band in which the loss of optical fibers is small. Networks of this type are generally constructed for the purpose of substituting for telephone communication networks within cities. In trunk optical communication networks connecting cities, wavelength division multiplexing optical transmission is mainstream that uses as the carrier wavelength the 1.5-μm band suitable for wavelength division multiplexing transmission.

When these types of optical communication networks are connected, since the carrier wavelengths are different from each other, it is necessary to temporarily convert the optical signals flowing on one network to electric signals and then convert the electric signals to optical signals using the carrier wavelength conforming to the other network. Then, the optical communication performance is limited according to the electric signal processing capability.

Therefore, by making it possible to directly convert the carrier wavelength of one network to the carrier wavelength of the other network, no electric signal processing is involved, so that the high performance of the optical communication can be effectively maintained. To do this, a light mixing technology for converting carrier wavelengths is essential.

In such wavelength conversion, since second harmonic generation (SHG), sum frequency generation (SFG), difference frequency generation (DFG), parametric conversion or the like by a nonlinear optical effect is used, a material with a high nonlinear optical effect is desired.

Examples of the related conventional art include Japanese Unexamined Patent Publication JP-A 10-213826 (1998), Japanese Unexamined Patent Publication JP-A 2000-10130 (2000), and a literature (IEICE Trans. Electron. Vol. E83-C, No. 6, pp. 869–874 (2000)).

The nonlinear optical effect largely depends on the polarization condition of the input light and the bearing of the nonlinear optical material. For example, when a light linearly polarized in a predetermined direction passes through an optical fiber, since the light is affected by the dispersion and the like of the optical fiber, the polarization condition at the exit of the optical fiber generally cannot be identified.

Moreover, since nonlinear optical materials are generally polarized light dependent in connection with wavelength conversion, when the polarization condition of the input light varies among carrier wavelengths, the wavelength conversion efficiency is inconstant, so that the intensity of the wavelength-converted output light is unstable.

SUMMARY OF THE INVENTION

An object of the invention is to provide a wavelength conversion apparatus capable of realizing stable wavelength conversion not depending on polarization conditions of signal light.

The invention relates to a wavelength conversion apparatus comprising:

a wavelength conversion element for carrying out wavelength conversion of a linearly polarized light component in a first direction; and polarization rotating means including a reflecting element for reflecting light having passed through the wavelength conversion element to return the light to the wavelength conversion element, for making a polarization direction difference of 90 degrees between a light traveling from the wavelength conversion element to the reflecting element and a light reflected at the reflecting element so as to return to the wavelength conversion element.

According to the invention, the wavelength conversion element is polarization dependent, namely, the wavelength conversion element can wavelength-convert the linearly polarized light component in the first direction, but cannot wavelength-convert the linearly polarized light component in a second direction perpendicular to the first direction, and by disposing the polarization rotating means behind the wavelength conversion element, when a pumped light and a signal light are input, the first-direction components of the pumped light and signal light are wavelength-converted by the wavelength conversion element, and the second-direction components perpendicular to the first direction are not wavelength-converted.

Then, when the lights are reflected at the polarization rotating means, the first-direction components which are perpendicular to the first direction of the wavelength conversion element are not wavelength-converted, and the second-direction components which are parallel to the first direction of the wavelength conversion element are wavelength-converted. Consequently, the first-direction components are wavelength-converted on the way to the reflecting element and the second-direction components are wavelength-converted on the way back, so that the composite intensity of the wavelength-converted outputs is constant. As a result, stable wavelength conversion not depending on the polarization condition of the signal light can be realized.

Moreover, in the invention, it is preferable that the wavelength conversion apparatus comprises a wavelength selection reflecting element, disposed between the wavelength conversion element and the polarization rotating means, for selectively reflecting a pumped light.

According to the invention, by disposing the wavelength selection reflecting element for selectively reflecting the pumped light between the wavelength conversion element and the polarization rotating means, when the pumped light and the signal light are input, the first-direction components of the pumped light and signal light are wavelength-converted by the wavelength conversion element, and the second-direction components perpendicular to the first direction are not wavelength-converted. Then, only the pumped light is returned to the wavelength conversion element by the wavelength selection reflecting element and the signal light passes through the wavelength selection reflecting element as it is.

Then, after being reflected at the polarization rotating means, the first-direction component and the second-direction component are again rotated by 45 degrees about the optical axis by a 45-degree polarization rotating element, and pass through the wavelength selection reflecting element as they are. Then, the first-direction component of the signal light perpendicular to the first direction of the wavelength conversion element is not wavelength-converted, the second-direction component of the signal light parallel to the first direction of the wavelength conversion element is wavelength-converted, and at this time, the first-direction component of the pumped light contributes to wavelength conversion. Consequently, since the first-direction component of the pumped light can contribute to wavelength conversion on both ways, the wavelength conversion efficiency is improved. Preferably, by using a linearly polarized light in the first direction as the pumped light, the wavelength conversion efficiency can be further improved.

Moreover, the invention relates to a wavelength conversion apparatus comprising:

a polarization separation element made of a birefringent material, for separating, by beam walk-off, a light to be wavelength-converted into two linearly polarized light components perpendicular to each other so as to travel along two different optical axes;

a wavelength conversion element for carrying out wavelength conversion in accordance with the linearly polarized light components traveling along the two optical axes; and a polarization multiplexing element for multiplexing two lights having passed through the wavelength conversion element.

According to the invention, after a light to be wavelength-converted is separated into two linearly polarized light components by beam walk-off, wavelength conversion for each of the two linearly polarized light components is carried out, and composition of the wavelength-converted components is carried out again, so that the composite intensity of the wavelength-converted output lights is constant. As a result, stable wavelength conversion not depending on the polarization condition of the signal light can be realized.

Moreover, the invention relates to a wavelength conversion apparatus comprising:

a polarization separation element for separating an incident light into a linearly polarized light in a first direction and a linearly polarized light in a second direction perpendicular to the first direction so that the linearly polarized light in the first direction travels along a first optical axis and the linearly polarized light in the second direction travels along a second optical axis;

a first 90-degree polarization rotating element for rotating by 90 degrees a polarization direction of a light traveling from the polarization separation element along the second optical axis;

a wavelength conversion element for wavelength-converting linearly polarized light components in the first direction with respect to a light traveling from the polarization separation element along the first optical axis and a light traveling from the first 90-degree polarization rotating element along the second optical axis;

a second 90-degree polarization rotating element for rotating by 90 degrees a polarization direction of a light traveling from the wavelength conversion element along the first optical axis; and a polarization multiplexing element for multiplexing a light traveling from the second 90-degree polarization rotating element along the first optical axis and a light traveling from the wavelength conversion element along the second optical axis.

According to the invention, the wavelength conversion element is polarization dependent, namely, the wavelength conversion element can wavelength-convert the linearly polarized light component in the first direction, but cannot wavelength-convert the linearly polarized light component in the second direction. When the pumped light and the signal light are input to the polarization separation element disposed in front of the wavelength conversion element, the polarization separation element separates along the first optical axis the linearly polarized lights in the first direction with respect to the pumped light and the signal light and along the second optical axis the linearly polarized lights in the second direction perpendicular to the first direction. The pumped light and the signal light traveling along the first optical axis are wavelength-converted by the wavelength conversion element. As for the pumped light and the signal light traveling along the second optical axis, when the pumped light and the signal light pass through the first 90-degree polarization rotating element, the polarization directions thereof become parallel to the first direction, and the pumped light and the signal light are wavelength-converted by the wavelength conversion element.

As for the pumped light and the signal light traveling from the wavelength conversion element along the first optical axis, when the pumped light and the signal light pass through the second 90-degree polarization rotating element, the polarization directions thereof become parallel to the second direction, and the pumped light and the signal light enter the polarization multiplexing element. The pumped light and the signal light traveling from the wavelength conversion element along the second optical axis enter the polarization multiplexing element as they are, and the lights along the optical axes are multiplexed. Consequently, the first-direction component is wavelength-converted on the first optical axis and the second-direction component is wavelength-converted on the second optical axis, so that the composite intensity of the wavelength-converted output lights is constant. As a result, stable wavelength conversion not depending on the polarization condition of the signal light can be realized.

Moreover, the invention relates to a wavelength conversion apparatus comprising:

a polarization separation element for separating an incident light into a linearly polarized light in a first direction and a linearly polarized light in a second direction perpendicular to the first direction so that the linearly polarized light in the first direction travels along a first optical axis and the linearly polarized light in the second direction travels along a second optical axis;

a first wavelength conversion element for wavelength-converting a linearly polarized light component in the first direction, with respect to a light traveling from the polarization separation element along the first optical axis;

a second wavelength conversion element for wavelength-converting a linearly polarized light component in the second direction, with respect to a light traveling from the polarization separation element along the second optical axis; and a polarization multiplexing element for multiplexing a light having passed through the first wavelength conversion element and a light having passed through the second wavelength conversion element.

According to the invention, the first and second wavelength conversion elements are polarization dependent, namely, the first wavelength conversion element can wavelength-convert the linearly polarized light component in the first direction, but cannot wavelength-convert the linearly polarized light component in the second direction, and the second wavelength conversion element can wavelength-convert the linearly polarized light component in the second direction, but cannot wavelength-convert the linearly polarized light component in the first direction. When the pumped light and the signal light are input to the polarization separation element disposed in front of the wavelength conversion elements, the polarization separation element separates the pumped light and the signal light into the linearly polarized lights in the first direction and the linearly polarized lights in the second direction perpendicular to the first direction so that the linearly polarized lights in the first direction travel along the first optical axis and the linearly polarized lights in the second direction travel along the second optical axis. The pumped light and the signal light traveling along the first optical axis are wavelength-converted by the first wavelength conversion element. The pumped light and the signal light traveling along the second optical axis are wavelength-converted by the second wavelength conversion element.

The pumped lights and the signal lights traveling from the first wavelength conversion element along the first optical axis and traveling from the second wavelength conversion element along the second optical axis are multiplexed by the polarization multiplexing element. Consequently, the first-direction component is wavelength-converted by the first wavelength conversion element, and the second-direction component is wavelength-converted by the second wavelength conversion element, so that the composite intensity of the wavelength-converted output lights is constant. As a result, stable wavelength conversion not depending on the polarization condition of the signal light can be realized.

Moreover, the invention relates to a wavelength conversion apparatus comprising:
- a polarization separation element for separating an incident light into a linearly polarized light in a first direction and a linearly polarized light in a second direction perpendicular to the first direction so that the linearly polarized light in the first direction travels along a first optical axis and the linearly polarized light in the second direction travels along a second optical axis;
- a 90-degree polarization rotating element for rotating by 90 degrees a polarization direction of a light traveling from the polarization separation element along the second optical axis;
- a wavelength conversion element for wavelength-converting linearly polarized light components in the first direction, with respect to a light traveling from the polarization separation element along the first optical axis and a light traveling from the 90-degree polarization rotating element along the second optical axis; and
- a reflecting element for reflecting lights traveling from the wavelength conversion element along the first optical axis and the second optical axis so that the light along the first optical axis passes through the wavelength conversion element, the light along the second optical axis passes through the wavelength conversion element and the 90-degree polarization rotating element in this order and these light are multiplexed by the polarization separation element.

According to the invention, the wavelength conversion element is polarization dependent, namely, the wavelength conversion element can wavelength-convert the linearly polarized light component in the first direction, but cannot wavelength-convert the linearly polarized light component in the second direction. When the pumped light and the signal light are input to the polarization separation element disposed in front of the wavelength conversion element, the polarization separation element separates along the first optical axis the linearly polarized lights in the first direction, with respect to the pumped light and the signal light and separates along the second optical axis the linearly polarized lights in the second direction perpendicular to the first direction. The pumped light and the signal light traveling along the first optical axis are wavelength-converted by the wavelength conversion element. As for the pumped light and the signal light traveling along the second optical axis, when the pumped light and the signal light pass through the first 90-degree polarization rotating element, the polarization directions thereof become parallel to the first direction, and the pumped light and the signal light are wavelength-converted by the wavelength conversion element.

The pumped lights, the signal lights and the output lights traveling from the wavelength conversion element along the first optical axis and the second optical axis are reflected at the reflecting element, and then, again pass through the same wavelength conversion element to be wavelength-converted. The pumped light, the signal light and the output light traveling along the second optical axis pass through the 90-degree polarization rotating element, so that the polarization directions thereof are made parallel to the second direction. Then, the lights enter the polarization separation element. The pumped lights, the signal lights and the output lights traveling along the optical axes are multiplexed by the polarization separation element. Consequently, the first-direction component is wavelength-converted on the first optical axis and the second-direction component is wavelength-converted on the second optical axis, so that the composite intensity of the wavelength-converted output lights is constant. As a result, stable wavelength conversion not depending on the polarization condition of the signal light can be realized.

Moreover, the invention relates to a wavelength conversion apparatus comprising:
- a polarization separation element for separating an incident light into a linearly polarized light in a first direction and a linearly polarized light in a second direction perpendicular to the first direction so that the linearly polarized light in the first direction travels along a first optical axis and the linearly polarized light in the second direction travels along a second optical axis;
- a first wavelength conversion element for wavelength-converting a linearly polarized light component in the first direction, with respect to a light traveling from the polarization separation element along the first optical axis;
- a second wavelength conversion element for wavelength-converting a linearly polarized light component in the second direction, with respect to a light traveling from the polarization separation element along the second optical axis; and
- a reflecting element for reflecting a light traveling from the first wavelength conversion element along the first optical axis and a light traveling from the second wavelength conversion element along the second optical axis so that a light having passed through the first wavelength conversion element and a light having passed through the second wavelength conversion element are multiplexed by the polarization separation element.

According to the invention, the first and second wavelength conversion elements are polarization dependent, namely, the first wavelength conversion element can wavelength-convert the linearly polarized light component in the first direction, but cannot wavelength-convert the linearly polarized light component in the second direction, and the second wavelength conversion element can wavelength-convert the linearly polarized light component in the second direction, but cannot wavelength-convert the linearly polarized light in the first direction. When the pumped light and the signal light are input to the polarization separation element disposed in front of the wavelength conversion elements, the polarization separation element separates along the first optical axis the linearly polarized lights in the first direction, with respect to the pumped light and the signal light, and along the second optical axis the linearly polarized lights in the second direction perpendicular to the first direction. The pumped light and the signal light traveling along the first optical axis are wavelength-converted by the first wavelength conversion element. The pumped light and the signal light traveling along the second optical axis are wavelength-converted by the second wavelength conversion element.

The pumped lights and the signal lights traveling from the wavelength conversion elements along the first optical axis and the second optical axis are reflected at the reflecting element, again pass through the same wavelength conversion elements to be wavelength-converted, and then, are multiplexed by the polarization multiplexing element. Consequently, the first-direction component is wavelength-converted by the first wavelength conversion element and the second-direction component is wavelength-converted by the second wavelength conversion element, so that the composite intensity of the wavelength-converted output lights is constant. As a result, stable wavelength conversion not depending on the polarization condition of the signal light can be realized.

Moreover, the invention relates to a wavelength conversion apparatus comprising:

a polarization separation element for separating an incident light into a linearly polarized light in a first direction and a linearly polarized light in a second direction perpendicular to the first direction so that the linearly polarized light in the first direction travels along a first optical axis and the linearly polarized light in the second direction travels along a second optical axis;

a wavelength conversion element for wavelength-converting a linearly polarized light component in the first direction, with respect to a light traveling from the polarization separation element along the first optical axis;

a polarization multiplexing element for multiplexing a light traveling from the wavelength conversion element along the first optical axis and a light traveling from the polarization separation element along the second optical axis; and polarization rotating means including a reflecting element for reflecting a light having passed through the polarization multiplexing element to return the light to the wavelength conversion element, for making a polarization direction difference of 90 degrees between a light traveling from the wavelength conversion element to the reflecting element and a light reflected at the reflecting element so as to return to the wavelength conversion element.

According to the invention, the wavelength conversion element is polarization dependent, namely, the wavelength conversion element can wavelength-convert the linearly polarized light component in the first direction, but cannot wavelength-convert the linearly polarized light component in the second direction. When the pumped light and the signal light are input to the polarization separation element disposed in front of the wavelength conversion element, the polarization separation element separates along the first optical axis the linearly polarized lights in the first direction, with respect to the pumped light and the signal light, and along the second optical axis the linearly polarized lights in the second direction perpendicular to the first direction. The pumped light and the signal light traveling along the first optical axis are wavelength-converted by the wavelength conversion element. The pumped light and the signal light traveling along the second optical axis are not wavelength-converted. The pumped lights and the signal lights traveling from the wavelength conversion element along the first optical axis and the second optical axis are multiplexed by the polarization multiplexing element.

Then, when the lights are reflected at the polarization rotating means, the polarization directions of the lights are rotated by 90 degrees. Then, the polarization multiplexing element separates along the second optical axis the pumped light and the signal light traveling along the first optical axis on the way to the reflecting element, and separates along the first optical axis the pumped light and the signal traveling along the second optical axis on the way back. The lights along the first optical axis are wavelength-converted by the wavelength conversion element, whereas the lights along the second optical axis are not wavelength-converted. Then, the pumped lights and the signal lights traveling from the wavelength conversion element along the first optical axis and the second optical axis are multiplexed by the polarization separation element. Consequently, the first-direction component is wavelength-converted on the way to the reflecting element and the second-direction component is wavelength-converted on the way back, so that the composite intensity of the wavelength-converted output lights is constant. As a result, stable wavelength conversion not depending on the polarization condition of the signal light can be realized.

Moreover, the invention relates to a wavelength conversion apparatus comprising:

a polarization separation element for separating an incident light into a linearly polarized light in a first direction and a linearly polarized light in a second direction perpendicular to the first direction so that the linearly polarized light in the first direction travels along a first optical axis and the linearly polarized light in the second direction travels along a second optical axis;

a first 90-degree polarization rotating element for rotating by 90 degrees a polarization direction of a light traveling from the polarization separation element along the second optical axis;

a wavelength conversion element for wavelength-converting linearly polarized light components in the first direction, with respect to a light traveling from the polarization separation element along the first optical axis and a light traveling from the first 90-degree polarization rotating element along the second optical axis;

a second 90-degree polarization rotating element for rotating by 90 degrees a polarization direction of a light traveling from the wavelength conversion element along the first optical axis;

a polarization multiplexing element for multiplexing a light traveling from the second 90-degree polarization rotating element along the first optical axis and a light traveling from the wavelength conversion element along the second optical axis; and polarization rotating means including a reflecting element for reflecting a light having passed through the polarization multiplexing element to return the light to the wavelength conversion element, for making a polarization direction difference of 90 degrees between a light traveling from the wavelength conversion element to the reflecting element and a light reflected at the reflecting element so as to return to the wavelength conversion element.

According to the invention, the wavelength conversion element is polarization dependent, namely, the wavelength conversion element can wavelength-convert the linearly polarized light component in the first direction, but cannot wavelength-convert the linearly polarized light component in the second direction. When the pumped light and the signal light are input to the polarization separation element disposed in front of the wavelength conversion element, the polarization separation element separates along the first optical axis the linearly polarized lights in the first direction, with respect to the pumped light and the signal light, and along the second optical axis the linearly polarized lights in the second direction perpendicular to the first direction. The pumped light and the signal light traveling along the first optical axis are wavelength-converted by the wavelength conversion element. As for the pumped light and the signal light traveling along the second optical axis, when the pumped light and the signal light pass through the first 90-degree polarization rotating element, the polarization directions thereof become parallel to the first direction, and the pumped light and the signal light are wavelength-converted by the wavelength conversion element.

The pumped light and the signal light traveling from the wavelength conversion element along the first optical axis pass through the second 90-degree polarization rotating element, so that the polarization directions thereof are made parallel to the second direction. Then, the lights enter the polarization multiplexing element. The pumped light and the signal light traveling from the wavelength conversion element along the second optical axis enter the polarization multiplexing element as they are. The lights along the optical axes are multiplexed.

Then, when the lights are reflected at the polarization rotating means, the polarization directions of the lights are rotated by 90 degrees. Then, the polarization multiplexing element separates along the second optical axis the pumped light and the signal light traveling along the first optical axis on the way to the reflecting element, and separates along the first optical axis the pumped light and the signal light traveling along the second optical axis on the way back. The pumped light and the signal light traveling along the first optical axis are wavelength-converted by the wavelength conversion element, and enters the polarization separation element as they are. As for the pumped light and the signal light traveling along the second optical axis, when the pumped light and the signal light pass through the second 90-degree polarization rotating element, the polarization directions thereof become parallel to the first direction, and the pumped light and the signal light are wavelength-converted by the wavelength conversion element. Then, when the pumped light and the signal light pass through the first 90-degree polarization rotating element, the polarization directions thereof become parallel to the second direction, and the pumped light and the signal light enter the polarization separation element. The pumped lights and the signal lights traveling along the optical axes are multiplexed by the polarization separation element. Consequently, the first-direction component and the second-direction component are wavelength-converted on both ways, so that the composite intensity of the wavelength-converted output lights is constant. As a result, stable wavelength conversion not depending on the polarization condition of the signal light can be realized.

Moreover, the invention relates to a wavelength conversion apparatus comprising:

a polarization separation element for separating an incident light into a linearly polarized light in a first direction and a linearly polarized light in a second direction perpendicular to the first direction so that the linearly polarized light in the first direction travels along a first optical axis and the linearly polarized light in the second direction travels along a second optical axis;

a first wavelength conversion element for wavelength-converting a linearly polarized light component in the first direction, with respect to a light traveling from the polarization separation element along the first optical axis;

a second wavelength conversion element for wavelength-converting a linearly polarized light component in the second direction, with respect to a light traveling from the polarization separation element along the second optical axis;

a polarization multiplexing element for multiplexing a light traveling from the first wavelength conversion element along the first optical axis and a light traveling from the second wavelength conversion element along the second optical axis; and polarization rotating means including a reflecting element for reflecting a light having passed through the polarization multiplexing element to return the light to the wavelength conversion element, for making a polarization direction difference of 90 degrees between a light traveling from the wavelength conversion element to the reflecting element and a light reflected at the reflecting element so as to return to the wavelength conversion element.

According to the invention, the first and second wavelength conversion elements are polarization dependent, namely, the first wavelength conversion element can wavelength-convert the linearly polarized light component in the first direction, but cannot wavelength-convert the linearly polarized light component in the second direction, and the second wavelength conversion element can wavelength-convert the linearly polarized light component in the second direction, but cannot wavelength-convert the linearly polarized light component in the first direction. When the pumped light and the signal light are input to the polarization separation element disposed in front of the wavelength conversion elements, the polarization separation element separates along the first optical axis the linearly polarized lights in the first direction, with respect to the pumped light and the signal light, and along the second optical axis the linearly polarized lights in the second direction perpendicular to the first direction. The pumped light and the signal light traveling along the first optical axis are wavelength-converted by the first wavelength conversion element. The pumped light and the signal light traveling along the second optical axis are wavelength-converted by the second wavelength conversion element.

The pumped lights and the signal lights traveling from the first wavelength conversion element along the first optical axis and traveling from the second wavelength conversion element along the second optical axis are multiplexed by the polarization multiplexing element.

Then, when the lights are reflected at the polarization rotating means, the polarization directions of the lights are rotated by 90 degrees. Then, the polarization multiplexing element separates along the second optical axis the pumped light and the signal light traveling along the first optical axis on the way to the reflecting element, and along the first optical axis the pumped light and the signal light traveling along the second optical axis on the way back. The light along the first optical axis is wavelength-converted by the first wavelength conversion element, and the light along the second optical axis is wavelength-converted by the second wavelength conversion element.

The pumped lights and the signal lights traveling from the first wavelength conversion element along the first optical axis and traveling from the second wavelength conversion element along the second optical axis are multiplexed by the polarization multiplexing element. Consequently, the first-direction component and the second-direction component are wavelength-converted on both ways, so that the composite intensity of the wavelength-converted output lights is constant. As a result, stable wavelength conversion not depending on the polarization condition of the signal light can be realized.

Moreover, in the invention, it is preferable that the polarization rotating means comprises a 45-degree rotating element for rotating a polarization direction of light by 45 degrees and the reflecting element for reflecting a light having passed through the 45-degree polarization rotating element to return the light to the 45-degree polarization rotating element, and the 45-degree rotating element is disposed between the wavelength conversion element and the reflecting element.

According to the invention, the light incident on the polarization rotating means can be returned to the wavelength conversion element by rotating the polarization direction of the light by 90 degrees.

Moreover, in the invention, it is preferable that the polarization rotating means comprises a λ/4 plate disposed between the reflecting element and the wavelength conversion element, and the reflecting element.

According to the invention, the light incident on the polarization rotating means can be returned to the wavelength conversion element by rotating the polarization direction of the light by 90 degrees.

As described above in detail, according to the invention, by wavelength conversion with respect to the linearly polarized light component in the first direction and the linearly polarized light component in the second direction perpendicular to the first direction, the composite intensity of the wavelength-converted output lights is constant, so that stable wavelength conversion not depending on the polarization condition of the signal light can be realized.

BRIEF DESCRIPTION OF THE DRAWINGS

Other and further-objects, features, and advantages of the invention will be more explicit from the following detailed description taken with reference to the drawings wherein.

DETAILED DESCRIPTION OF THE PREFERRED EMBODIMENTS

Figure 1:
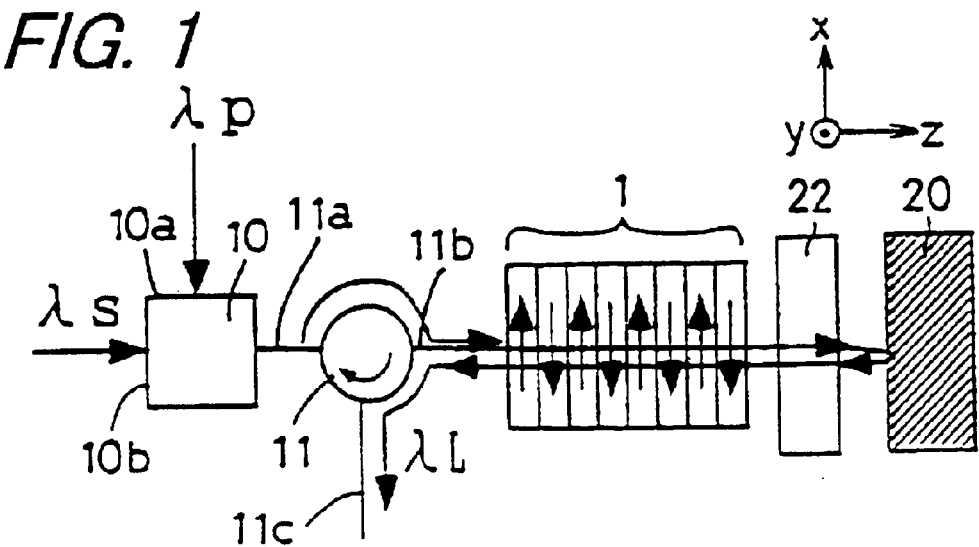
FIG. 1 is a block diagram showing a first embodiment of the invention.

Now referring to the drawings, preferred embodiments of the invention are described below.

FIG. 1 is a block diagram showing a first embodiment of the invention. The wavelength conversion apparatus comprises a multiplexer 10, a light circulator 11, a wavelength conversion element 1, a Faraday rotator 22 and a reflecting mirror 20.

The multiplexer 10 has an input port 10a to which pumped light (wavelength $\lambda p$) is input and an input port 10b to which signal light (wavelength $\lambda s$) is input. The multiplexer 10 multiplexes the pumped light and the signal light, and outputs the multiplexed lights along the same optical axis.

The light circulator 11 outputs the light input to a port 11a to a port 11b, and outputs the light input to the port 11b to a port 11c.

The wavelength conversion elements 1 and 2 are made of a nonlinear optical material such as $LiNbO_3$ (LN for short), $LiTaO_3$ (LT for short), $KNbO_3$ (KN for short) or $KTiOPO_4$ (KTP for short). In this embodiment, an example is shown that uses quasi phase matching (QPM) elements whose polarization directions are alternately reversed at intervals of the coherence length. The wavelength conversion element 1 is disposed so that the polarization direction thereof is parallel to the x direction (parallel to the plane of the figure and vertical to the optical axis).

The Faraday rotator 22 rotates the polarization direction of light by 45 degrees about the optical axis in a predetermined direction. The reflecting mirror 20 reflects the incident light onto the same optical axis.

In cases where the conversion constant d33 of the nonlinear optical material is used in wavelength conversion, when the polarization direction of the wavelength conversion element, the polarization direction of the pumped light and the polarization direction of the signal light coincide with one another, a wavelength-converted output light (wavelength $\lambda L$) is generated in the same polarization direction.

For example, when wavelength conversion is performed in a 1.5-$\mu$m-band optical fiber communication by performing cascade difference frequency generation, the wavelength $\lambda s$ is set in a C band (1.53 to 1.56 $\mu$m), the wavelength $\lambda L$ is set in an L band (1.56 to 1.61 $\mu$m), and the wavelength $\lambda p$ is set to 1.56 μm at the midpoint between the C band and the L band. The relationship of the following equation (1) holds among the wavelength λp of the pumped light, the wavelength λs of the signal light and the wavelength λL of the output light:

$$1/\lambda L = 2/\lambda p - 1/\lambda s \qquad (1)$$

Next, the operation will be described. For example, a linearly polarized light in which the ratio between the x-direction component and the y-direction component is 1:1 is used as the pumped light. It is assumed that the polarization direction of the signal light varies with time and is uncertain.

The pumped light and the signal light are multiplexed by the multiplexer 10, and pass through the wavelength conversion element 1 by way of the port 11a and the port 11b of the light circulator 11. The pumped light and signal light are wavelength-converted with respect to their x-direction components by the wavelength conversion element 1 polarized in the x direction to be output as a light polarized in the x direction. The pumped light and the signal light are not wavelength-converted with respect to the y-direction components thereof, because the y-direction components are perpendicular to the polarization direction of the wavelength conversion element 1.

Then, the pumped light, the signal light and the output light pass through the Faraday rotator 22, so that the polarization directions thereof are rotated by 45 degrees. Then, the pumped light, the signal light and the output light are reflected at the reflecting mirror 20, and again pass through the Faraday rotator 22, so that the polarization directions thereof are further rotated by 45 degrees. With this, the polarization directions are rotated by 90 degrees with respect to the directions before the lights are incident on the Faraday rotator 22. Then, the pumped light, the signal light and the output light are again input to the wavelength conversion element 1. At this time, the x-direction components of the pumped light and the signal light which are rotated in the y direction are not wavelength-converted by the wavelength conversion element 1, whereas the y-direction components of the pumped light and the signal light which are rotated in the x direction are wavelength-converted by the wavelength conversion element 1. Consequently, the x-direction components before input are wavelength-converted on the way to the reflecting mirror 20, and the y-direction components before input are wavelength-converted on the way back.

The wavelength-converted output light is extracted by way of the port 11b and the port 11c of the light circulator 11.

Using the incident polarization angle φ of the signal light, the electric field intensity Ep of the pumped light, the electric field intensity Es of the signal light, the clockwise conversion efficiency ηr, the counterclockwise conversion efficiency ηl and the optical length L of the wavelength conversion element 1, the intensity IL of the output light is expressed as the following equation (2):

$$IL = (\eta r \cdot L \cdot Ep/\sqrt{2} \cdot Es \cdot \cos \phi)^2 + (\eta l \cdot L \cdot Ep/\sqrt{2} \cdot Es \cdot \sin \phi)^2 \qquad (2)$$

Since the lights pass through the same part of the wavelength conversion element 1 on both ways, ηr=ηl, and the intensity IL of the output light is expressed as the equation (3):

$$IL = (\eta r \cdot L \cdot Ep \cdot Es)^2/2 \qquad (3)$$

Consequently, the intensity IL of the output light does not depend on the incident polarization angle φ of the signal light and is constant, so that wavelength conversion being stable even when the polarization condition of the signal light varies can be realized.

Figure 2:
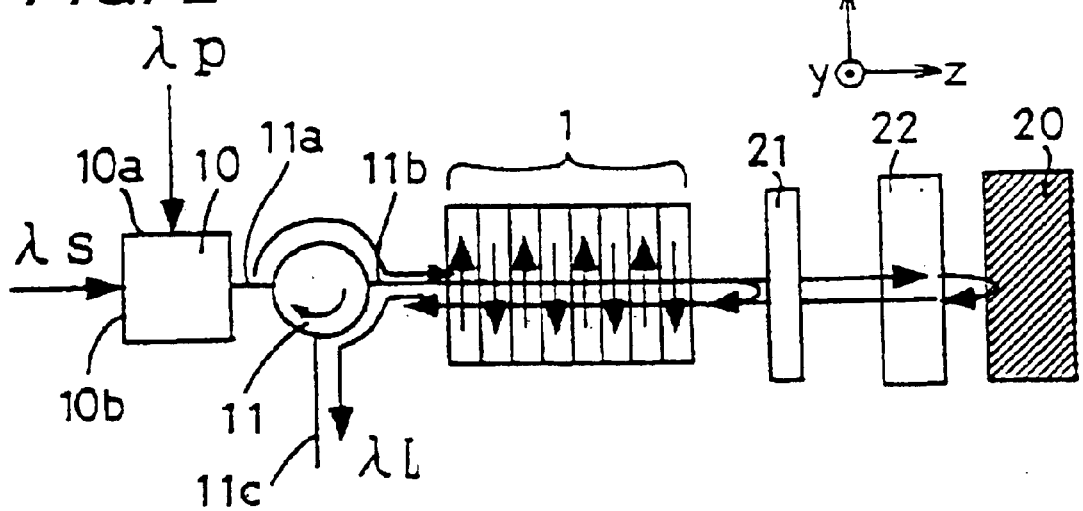
FIG. 2 is a block diagram showing a second embodiment of the invention.

FIG. 2 is a block diagram showing a second embodiment of the invention. The wavelength conversion apparatus includes a multiplexer 10, a light circulator 11, a wavelength conversion element 1, a wavelength selection reflecting mirror 21, a Faraday rotator 22 and a reflecting mirror 20.

The multiplexer 10 has an input port 10a to which pumped light (wavelength λp) is input and an input port 10b to which signal light (wavelength λs) is input. The multiplexer 10 multiplexes the pumped light and the signal light, and outputs the multiplexed lights along the same optical axis.

The light circulator 11 outputs the light input to a port 11a to a port 11b, and outputs the light input to the port 11b to a port 11c.

The wavelength conversion element 1 is made of a nonlinear optical material such as LN, LT, KN or KTP. In this embodiment, an example is shown that uses a QPM element whose polarization direction is alternately reversed at intervals of the coherence length. The wavelength conversion element 1 is disposed so that the polarization direction there of is parallel to the x direction.

The wavelength selection reflecting mirror 21 comprises a dichroic mirror or the like, and has the property of reflecting the pumped light and transmitting the signal light and the output light. At this time, the larger the difference between the reflected wavelength and the transmitted wavelength is, the more excellent the obtained property is. Therefore, it is desirable to set the wavelength of the pumped light to the wavelength corresponding to the second harmonic of the fundamental wavelength.

The Faraday rotator 22 rotates the polarization direction of light by 45 degrees about the optical axis in a predetermined direction. The reflecting mirror 20 reflects the incident light onto the same optical axis.

In cases where the conversion constant d33 of the nonlinear optical material is used in wavelength conversion, when the polarization direction of the wavelength conversion element, the polarization direction of the pumped light and the polarization direction of the signal light coincide with one another, a wavelength-converted output light (wavelength λL) is generated in the same polarization direction.

For example, when wavelength conversion is performed in a 1.5-μm-band optical fiber communication by performing simple difference frequency generation, the wavelength λs is set in the C band, the wavelength λL is set in the L band, and the wavelength λp is set to 0.78 μm corresponding to half of 1.56 μm at the midpoint between the C band and the L band. The relationship of the following equation (1A) holds among the wavelength λp of the pumped light, the wavelength λs of the signal light and the wavelength λL of the output light:

$$1/\lambda L = 1/\lambda p - 1/\lambda s \qquad (1A)$$

Next, the operation will be described. For example, a linearly polarized light in the x direction is used as the pumped light. It is assumed that the polarization direction of the signal light varies with time and is uncertain.

The pumped light and the signal light are multiplexed by the multiplexer 10, and pass through the wavelength conversion element 1 by way of the port 11a and the port 11b of the light circulator 11. The x-direction components of the pumped light and the signal light are wavelength-converted to an output light polarized in the x direction by the wavelength conversion element 1 polarized in the x direction. Since the y-direction components of the pumped light and the signal light are perpendicular to the polarization direction of the wavelength conversion element 1, the y-direction components are not wavelength-converted.

Then, the wavelength selection reflecting mirror 21 reflects only the pumped light from the wavelength conversion element 1, and inputs the reflected pumped light again to the wavelength conversion element 1. The signal light and the output light pass through the wavelength selection reflecting mirror 21. Consequently, the pumped light linearly polarized in the x direction can contribute to wavelength conversion on both ways.

Then, the signal light and the output light pass through the Faraday rotator 22, so that the polarization directions thereof are rotated by 45 degrees. Then, the signal light and the output light are reflected at the reflecting mirror 20 and again pass through the Faraday rotator 22, so that the polarization directions thereof are further rotated by 45 degrees. With this, the polarization directions are rotated by 90 degrees with respect to the directions before the lights are incident on the Faraday rotator 22. Then, the signal light and the output light pass through the wavelength selection reflecting mirror 21, and are again input to the wavelength conversion element 1. At this time, the x-direction component of the signal light which is rotated in the y direction is not wavelength-converted by the wavelength conversion element 1, whereas the y-direction component of the signal light which is rotated in the x direction is wavelength-converted by the wavelength conversion element 1. Consequently, the x-direction component before input is wavelength-converted on the way to the reflecting mirror 20, and the y-direction component before input is wavelength-converted on the way back.

The wavelength-converted output light is extracted by way of the port 11b and the port 11c of the light circulator 11.

In the structure of FIG. 2, cascade difference frequency generation can be performed. In this case, the wavelength $\lambda s$ is set in the C band, the wavelength $\lambda L$ is set in the L band, and the wavelength $\lambda p$ is set to 1.56 $\mu$m at the midpoint between the C band and the L band. The relationship of the following equation (1) holds among the wavelength $\lambda p$ of the pumped light, the wavelength $\lambda s$ of the signal light and the wavelength $\lambda L$ of the output light:

$$1/\lambda L = 2/\lambda p - 1/\lambda s \quad (1)$$

In this case, since the wavelengths of the pumped light, the signal light and the output light are close to one another, it is desirable to use as the wavelength selection reflecting mirror 21 an optical element having a steeper wavelength selecting property, for example, a fiber-type filter such as a fiber Bragg grating (FBG), or a narrow-band optical coating filter.

Using the incident polarization angle $\phi$ of the signal light, the electric field intensity Ep of the pumped light, the electric field intensity Es of the signal light, the clockwise conversion efficiency $\eta r$, the counterclockwise conversion efficiency $\eta l$ and the optical length L of the wavelength conversion element 1, since the pumped light contributes on both ways, the intensity IL of the output light is expressed as the following equation (4):

$$IL = (\eta r \cdot L \cdot Ep \cdot Es \cdot \cos \phi)^2 + (\eta l \cdot L \cdot Ep \cdot Es \cdot \sin \phi)^2 \quad (4)$$

Since the lights pass through the same part of the wavelength conversion element 1 on both ways, $\eta r = \eta l$, and the intensity IL of the output light is expressed as the equation (5):

$$IL = (\eta r \cdot L \cdot Ep \cdot Es)^2 \quad (5)$$

Consequently, the intensity IL of the output light does not depend on the incident polarization angle $\phi$ of the signal light and is constant, so that wavelength conversion being stable even when the polarization condition of the signal light varies can be realized. In addition, since the pumped light contributes on both ways, the intensity IL of the output light is twice the intensity IL of FIG. 1, so that the wavelength conversion efficiency can be further improved.

Figure 3:
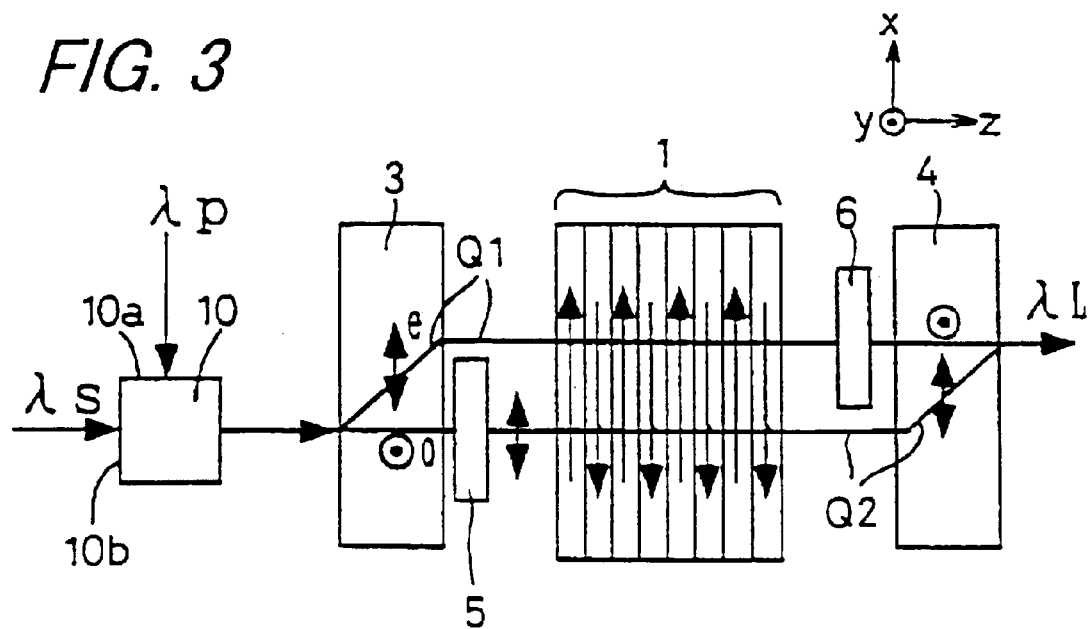
FIG. 3 is a block diagram showing a third embodiment of the invention.

FIG. 3 is a block diagram showing a third embodiment of the invention. The wavelength conversion apparatus includes a multiplexer 10, a polarization separation element 3, a wavelength conversion element 1, a polarization multiplexing element 4, and 90-degree polarization rotating elements 5 and 6.

The multiplexer 10 has an input port 10a to which pumped light (wavelength $\lambda p$) is input and an input port 10b to which signal light (wavelength $\lambda s$) is input. The multiplexer 10 multiplexes the pumped light and the signal light, and outputs the multiplexed lights along the same optical axis.

The wavelength conversion element 1 is made of a nonlinear optical material such as LN, LT, KN or KTP. In this embodiment, an example is shown that uses a QPM element whose polarization direction is alternately reversed at intervals of the coherence length. The wavelength conversion element 1 is disposed so that the polarization direction thereof is parallel to the x direction.

The polarization separation element 3 and the polarization multiplexing element 4 are made of a material such as a birefringent optical crystal cut obliquely with respect to the crystallographic axis (for example, YVO$_4$ cut in a direction at an angle of 45 degrees from the c axis), and have the function of, by a beam walk-off effect, separating an incident light into the linearly polarized light in the x direction which travels along the optical axis Q1, as extraordinary light e, and the linearly polarized light in the y direction which travels along the optical axis Q2, as ordinary light o, or multiplexing the linearly polarized light in the x direction incident along the optical axis Q1 and the linearly polarized light in the y direction incident along the optical axis Q2.

The 90-degree polarization rotating elements 5 and 6 comprise half-wave plates or the like, and have the function of rotating the polarization direction of the incident light by 90 degrees.

In cases where the conversion constant d33 of the nonlinear optical material is used in wavelength conversion, when the polarization direction of the wavelength conversion element, the polarization direction of the pumped light and the polarization direction of the signal light coincide with one another, a wavelength-converted output light (wavelength $\lambda L$) is generated in the same polarization direction.

For example, when wavelength conversion is performed in a 1.5-$\mu$m-band optical fiber communication by performing cascade difference frequency generation, the wavelength $\lambda s$ is set in the C band, the wavelength $\lambda L$ is set in the L band, and the wavelength $\lambda p$ is set to 1.56 $\mu$m at the midpoint between the C band and the L band. The relationship of the following equation (1) holds among the wavelength $\lambda p$ of the pumped light, the wavelength $\lambda s$ of the signal light and the wavelength $\lambda L$ of the output light:

$$1/\lambda L = 2/\lambda p - 1/\lambda s \quad (1)$$

Next, the operation will be described. For example, a linearly polarized light in which the ratio between the x-direction component and the y-direction component is 1:1 in the part where the light is incident on the polarization separation element 3, that is, a linearly polarized light rotated by 45 degrees with respect to the principal axis of the polarization separation element 3 is used as the pumped light. It is assumed that the polarization direction of the signal light varies with time and is uncertain.

The pumped light and the signal light are multiplexed by the multiplexer 10 and incident on the polarization separation element 3. Then, the linearly polarized lights, in the x direction, of the pumped light and the signal light are separated along the optical axis Q1 by the polarization separation element 3, are wavelength-converted to an output light polarized in the x direction by the wavelength conversion element 1 polarized in the x direction, are converted to a linearly polarized light in the y direction by the 90-degree polarization rotating element 6, and then enter the polarization multiplexing element 4. On the other hand, the linearly polarized lights, in the y direction, of the pumped light and the signal light are separated along the optical axis Q2 by the polarization separation element 3, are converted to a linearly polarized light in the x direction by the 90-degree polarization rotating element 5, are wavelength-converted to an output light polarized in the x direction by the wavelength conversion element 1, and then enter the polarization multiplexing element 4.

The polarization multiplexing element 4 multiplexes the pumped lights, the signal lights and the output lights incident along the optical axes Q1 and Q2, and outputs the multiplexed lights along the same optical axes.

Since the x-direction component is wavelength-converted on the optical axis Q1 and the y-direction component is wavelength-converted on the optical axis Q2 as described above, the composite intensity of the wavelength-converted output lights is constant, so that stable wavelength conversion not depending on the polarization condition of the signal light can be realized.

Figure 4:
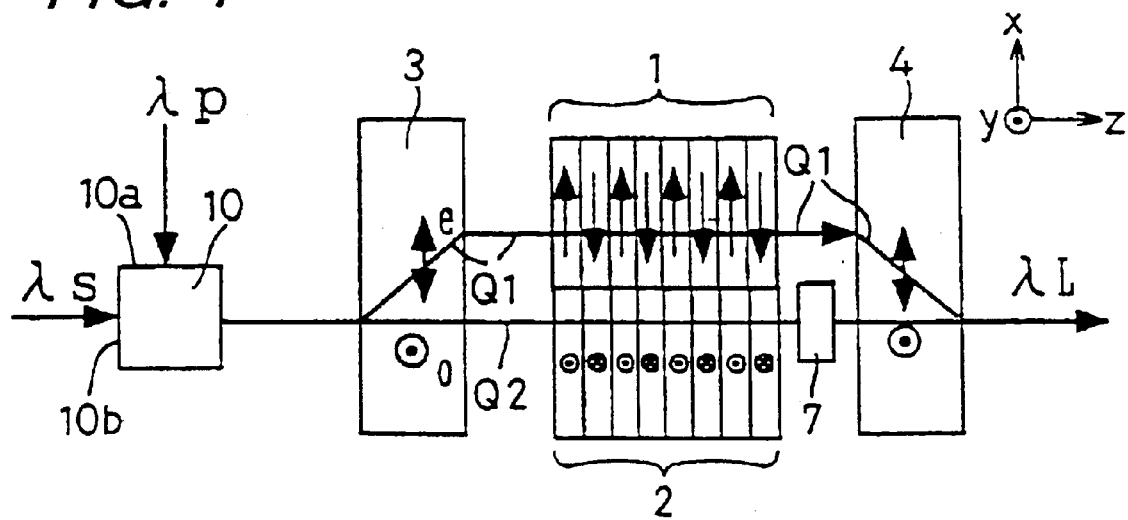
FIG. 4 is a block diagram showing a fourth embodiment of the invention.

FIG. 4 is a block diagram showing a fourth embodiment of the invention. The wavelength conversion apparatus includes a multiplexer 10, a polarization separation element 3, wavelength conversion elements 1and 2, a polarization multiplexing element 4, and an optical delay element 7.

The multiplexer 10 has an input port 10a to which pumped light (wavelength $\lambda p$) is input and an input port 10b to which signal light (wavelength $\lambda s$) is input. The multiplexer 10 multiplexes the pumped light and the signal light, and outputs the multiplexed lights along the same optical axis.

The wavelength conversion elements 1 and 2 are made of a nonlinear optical material such as LN, LT, KN or KTP. In this embodiment, an example is shown that uses QPM elements whose polarization directions are alternately reversed at intervals of the coherence length. The wavelength conversion element 1 is disposed so that the polarization direction thereof is parallel to the x direction. The wavelength conversion element 2 is disposed so that the polarization direction thereof is parallel to the y direction.

The polarization separation element 3 and the polarization multiplexing element 4 are made of a material such as a birefringent optical crystal cut obliquely with respect to the crystallographic axis (for example, $YVO_4$ cut in a direction at an angle of 45 degrees from the c axis), and have the function of, by a beam walk-off effect, separating an incident light into the linearly polarized light in the x direction which travels along the optical axis Q1, as extraordinary light e, and the linearly polarized light in the y direction which travels along the optical axis Q2, as ordinary light o, or multiplexing the linearly polarized light in the x direction incident along the optical axis Q1 and the linearly polarized light in the y direction incident along the optical axis Q2.

The optical delay element 7 is made of a transparent material or the like having a predetermined optical length, and has the function of making the optical lengths of the optical axes Q1 and Q2 from the incident surface of the polarization separation element 3 to the exit surface of the polarization multiplexing device 4 coincide with each other to thereby eliminate the phase difference, in the case of pulses, the pulse delay time difference between the output lights generated along the optical axes Q1 and Q2. When such a phase difference is practically ignorable, the optical delay element 7 can be omitted.

In cases where the conversion constant d33 of the nonlinear optical material is used in wavelength conversion, when the polarization direction of the wavelength conversion element, the polarization direction of the pumped light and the polarization direction of the signal light coincide with one another, a wavelength-converted output light (wavelength $\lambda L$) is generated in the same polarization direction.

For example, when wavelength conversion is performed in a 1.5-$\mu$m-band optical fiber communication by performing cascade difference frequency generation, the wavelength $\lambda s$ is set in the C band, the wavelength $\lambda L$ is set in the L band, and the wavelength $\lambda p$ is set to 1.56 $\mu$m at the midpoint between the C band and the L band. The relationship of the following equation (1) holds among the wavelength $\lambda p$ of the pumped light, the wavelength $\lambda s$ of the signal light and the wavelength $\lambda L$ of the output light:

$$1/\lambda L = 2/\lambda p - 1/\lambda s \qquad (1)$$

Next, the operation will be described. For example, a linearly polarized light in which the ratio between the x-direction component and the y-direction component is 1:1 in the part where the light is incident on the polarization separation element 3, that is, a linearly polarized light rotated by 45 degrees with respect to the principal axis of the polarization separation element 3 is used as the pumped light. It is assumed that the polarization direction of the signal light varies with time and is uncertain.

The pumped light and the signal light are multiplexed by the multiplexer 10 and incident on the polarization separation element 3. Then, the linearly polarized lights, in the x direction, of the pumped light and the signal light are separated along the optical axis Q1 by the polarization separation element 3, are wavelength-converted to an output light polarized in the x direction by the wavelength conversion element 1 polarized in the x direction, and enter the polarization multiplexing element 4. On the other hand, the linearly polarized lights, in the y direction, of the pumped light and the signal light are separated along the optical axis Q2 by the polarization separation element 3, are wavelength-converted to an output light polarized in the y direction by the wavelength conversion element 1 polarized in the y direction, and after passing through the optical delay element 7, enter the polarization multiplexing element 4.

The polarization multiplexing element 4 multiplexes the pumped lights, the signal lights and the output lights incident along the optical axes Q1 and Q2, and outputs the multiplexed lights along the same optical axes.

Since the x-direction component is wavelength-converted on the optical axis Q1 and the y-direction component is wavelength-converted on the optical axis Q2 as described above, the composite intensity of the wavelength-converted output lights is constant, so that stable wavelength conversion not depending on the polarization condition of the signal light can be realized.

Figure 5:
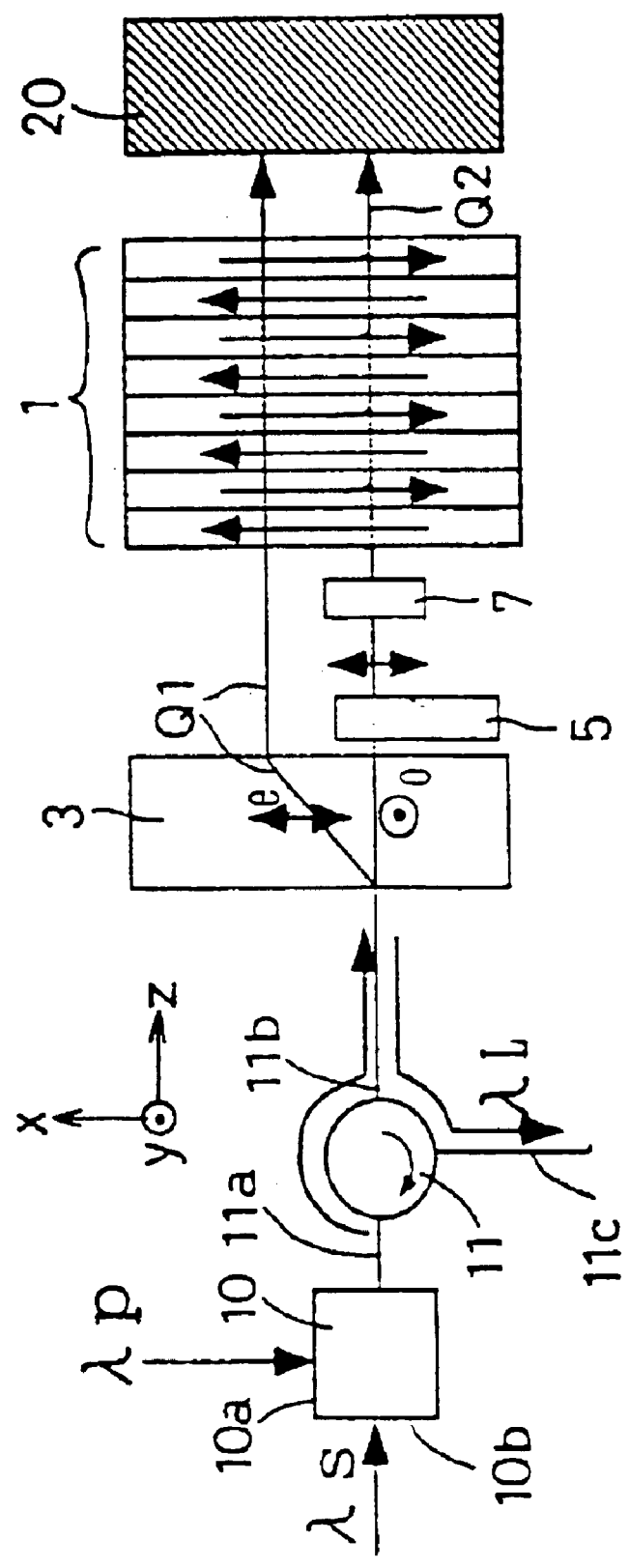
FIG. 5 is a block diagram showing a fifth embodiment of the invention.

FIG. 5 is a block diagram showing a fifth embodiment of the invention. The wavelength conversion apparatus includes a multiplexer 10, a light circulator 11, a polarization separation device 3, a wavelength conversion element 1, a reflecting mirror 20, a 90-degree polarization rotating element 5, and an optical delay element 7.

The multiplexer 10 has an input port 10a to which pumped light (wavelength λp) is input and an input port 10b to which signal light (wavelength λs) is input. The multiplexer 10 multiplexes the pumped light and the signal light, and outputs the multiplexed lights along the same optical axis.

The light circulator 11 outputs the light input to a port 11a to a port 11b, and outputs the light input to the port 11b to a port 11c.

The wavelength conversion element 1 is made of a nonlinear optical material such as LN, LT, KN or KTP. In this embodiment, an example is shown that uses a QPM element whose polarization direction is alternately reversed at intervals of the coherence length. The wavelength conversion element 1 is disposed so that the polarization direction thereof is parallel to the x direction.

The polarization separation element 3 is made of a material such as a birefringent optical crystal cut obliquely with respect to the crystallographic axis (for example, $YVO_4$ cut in a direction at an angle of 45 degrees from the c axis), and has the function of, by a beam walk-off effect, separating an incident light into the linearly polarized light in the x direction which travels along the optical axis Q1, as extraordinary light e, and the linearly polarized light in the y direction which travels along the optical axis Q2, as ordinary light o, or multiplexing the linearly polarized light in the x direction incident along the optical axis Q1 and the linearly polarized light in the y direction incident along the optical axis Q2.

The 90-degree polarization rotating element 5 comprises a half-wave plate or the like, and has the function of rotating the polarization direction of the incident light by 90 degrees.

The optical delay-element 7 is made of a transparent material or the like having a predetermined optical length, and has the function of making the optical lengths of the optical axes Q1 and Q2 from the incident surface of the polarization separation element 3 to the exit surface of the polarization multiplexing device 4 coincide with each other to thereby eliminate the phase difference, in the case of pulses, the pulse delay time difference between the output lights generated along the optical axes Q1 and Q2. When such a phase difference is practically ignorable, the optical delay element 7 can be omitted.

In cases where the conversion constant d33 of the nonlinear optical material is used in wavelength conversion, when the polarization direction of the wavelength conversion element, the polarization direction of the pumped light and the polarization direction of the signal light coincide with one another, a wavelength-converted output light (wavelength λL) is generated in the same polarization direction.

For example, when wavelength conversion is performed in a 1.5-μm-band optical fiber communication by performing cascade difference frequency generation, the wavelength λs is set in the C band, the wavelength λL is set in the L band, and the wavelength λp is set to 1.56 μm at the midpoint between the C band and the L band. The relationship of the following equation (1) holds among the wavelength λp of the pumped light, the wavelength λs of the signal light and the wavelength λL of the output light:

$$1/\lambda L = 2/\lambda p - 1/\lambda s \qquad (1)$$

Next, the operation will be described. For example, a linearly polarized light in which the ratio between the x-direction component and the y-direction component is 1:1 in the part where the light is incident on the polarization separation element 3, that is, a linearly polarized light rotated by 45 degrees with respect to the principal axis of the polarization separation element 3 is used as the pumped light. It is assumed that the polarization direction of the signal light varies with time and is uncertain.

The pumped light and the signal light are multiplexed by the multiplexer 10 and incident on the polarization separation element 3 by way of the port 11a and the port 11b of the light circulator 11. Then, the linearly polarized lights, in the x direction, of the pumped light and the signal light are separated along the optical axis Q1 by the polarization separation element 3, and are wavelength-converted to an output light polarized in the x direction by the wavelength conversion element 1 polarized in the x direction. On the other hand, the linearly polarized lights, in the y direction, of the pumped light and the signal light are separated along the optical axis Q2 by the polarization separation element 3, are converted to a linearly polarized light in the x direction by the 90-degree polarization rotating element 5, and after passing through the optical delay element 7, are wavelength-converted to an output light polarized in the x direction by the wavelength conversion element 1.

The pumped lights, the signal lights and the output lights traveling from the wavelength conversion element 1 along the optical axes Q1 and Q2 are reflected at the reflecting mirror 20, and then, again pass through the same wavelength conversion element 1 to be wavelength-converted. The pumped light, the signal light and the output light traveling along the optical axis Q1 enter the polarization separation element 3 as they are. The pumped light, the signal light and the output light traveling along the optical axis Q2 pass through the optical delay element 7, and then enter the polarization separation element 3 with the polarization directions thereof made parallel to the y direction by the 90-degree polarization rotating device 5.

The pumped lights, the signal lights and the output lights traveling along the optical axes Q1 and Q2 are multiplexed by the polarization separation element 3. The output lights are extracted by way of the port 11b and the port 11c of the light circulator 11.

Since the x-direction component is wavelength-converted on the optical axis Q1 and the y-direction component is wavelength-converted on the optical axis Q2 as described above, the composite intensity of the wavelength-converted output lights is constant, so that stable wavelength conversion not depending on the polarization condition of the signal light can be realized.

Figure 6:
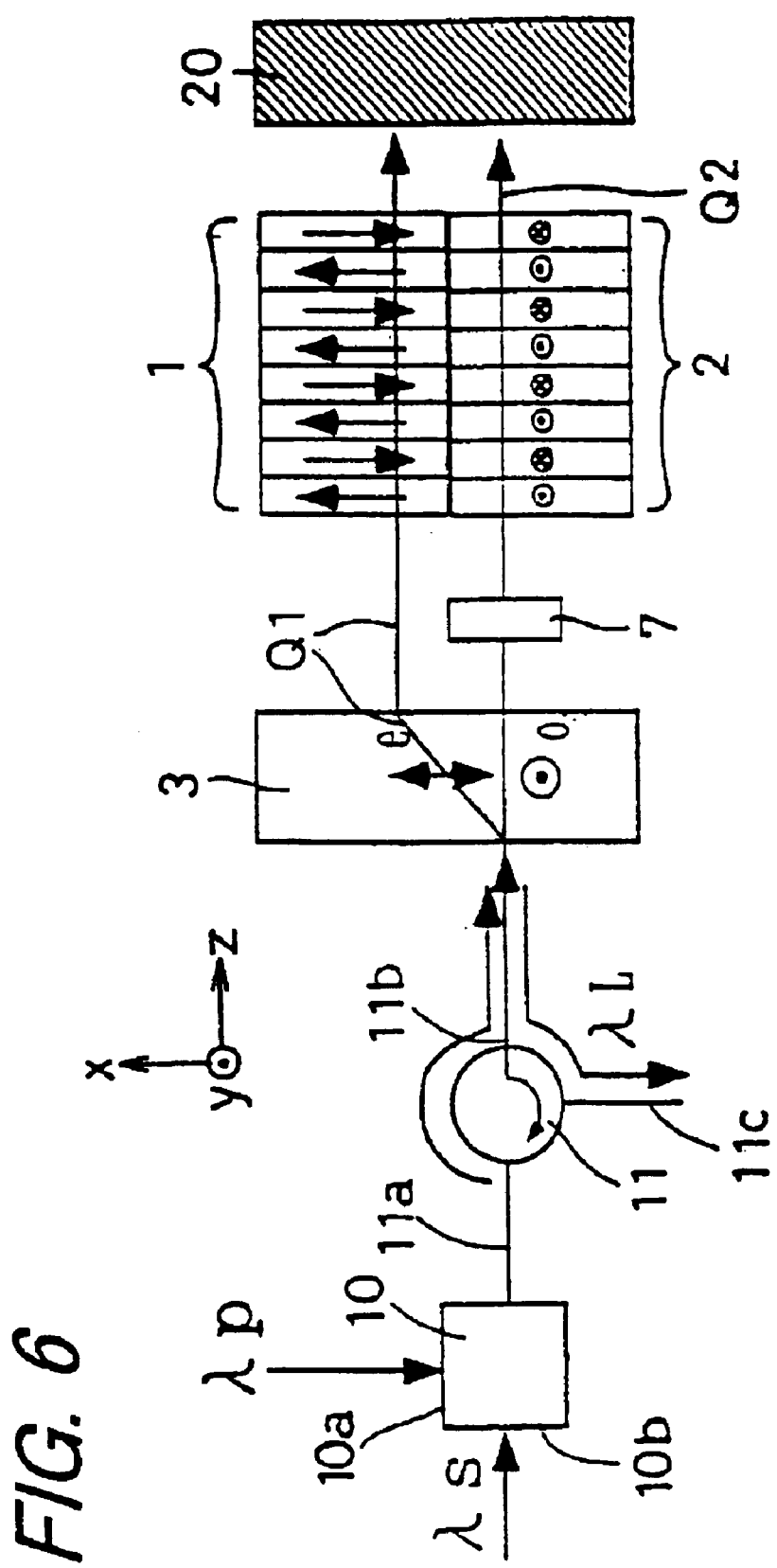
FIG. 6 is a block diagram showing a sixth embodiment of the invention.

FIG. 6 is a block diagram showing a sixth embodiment of the invention. The wavelength conversion apparatus includes a multiplexer 10, a light circulator 11, a polarization separation element 3, a wavelength conversion element 1, a reflecting mirror 20, and an optical delay element 7.

The multiplexer 10 has an input port 10a to which pumped light (wavelength λp) is input and an input port 10b to which signal light (wavelength λs) is input. The multiplexer 10 multiplexes the pumped light and the signal light, and outputs the multiplexed lights along the same optical axis.

The light circulator 11 outputs the light input to a port 11a to a port 11b, and outputs the light input to the port 11b to a port 11c.

The wavelength conversion elements 1 and 2 are made of a nonlinear optical material such as LN, LT, KN or KTP. In this embodiment, an example is shown that uses QPM elements whose polarization directions are alternately reversed at intervals of the coherence length. The wavelength conversion element 1 is disposed so that the polarization direction thereof is parallel to the x direction. The wavelength conversion element 2 is disposed so that the polarization direction thereof is parallel to the y direction (vertical to the plane of the figure and vertical to the optical axis).

The polarization separation element 3 is made of a material such as a birefringent optical crystal cut obliquely with respect to the crystallographic axis (for example, YVO$_4$ cut in a direction at an angle of 45 degrees from the c axis), and has the function of, by a beam walk-off effect, separating an incident light into the linearly polarized light in the x direction which travels along the optical axis Q1, as extraordinary light e, and the linearly polarized light in the y direction which travels along the optical axis Q2, as ordinary light o, or multiplexing the linearly polarized light in the x direction incident along the optical axis Q1 and the linearly polarized light in the y direction incident along the-optical axis Q2.

The optical delay element 7 is made of a transparent material or the like having a predetermined optical length, and has the function of making the optical lengths of the optical axes Q1 and Q2 from the incident surface of the polarization separation element 3 to the exit surface of the polarization multiplexing device 4 coincide with each other to thereby eliminate the phase difference, in the case of pulses, the pulse delay time difference between the output lights generated along the optical axes Q1 and Q2. When such a phase difference is practically ignorable, the optical delay element 7 can be omitted.

In cases where the conversion constant d33 of the non-linear optical material is used in wavelength conversion, when the polarization direction of the wavelength conversion element, the polarization direction of the pumped light and the polarization direction of the signal light coincide with one another, a wavelength-converted output light (wavelength λL) is generated in the same polarization direction.

For example, when wavelength conversion is performed in a 1.5-μm-band optical fiber communication by performing cascade difference frequency generation, the wavelength λs is set in the C band, the wavelength λL is set in the L band, and the wavelength λp is set to 1.56 μm at the midpoint between the C band and the L band. The relationship of the following equation (1) holds among the wavelength λp of the pumped light, the wavelength λs of the signal light and the wavelength λL of the output light:

$$1/\lambda L = 2/\lambda p - 1/\lambda s \quad (1)$$

Next, the operation will be described. For example, a linearly polarized light in which the ratio between the x-direction component and the y-direction component is 1:1 in the part where the light is incident on the polarization separation element 3, that is, a linearly polarized light rotated by 45 degrees with respect to the principal axis of the polarization separation element 3 is used as the pumped light. It is assumed that the polarization direction of the signal light varies with time and is uncertain.

The pumped light and the signal light are multiplexed by the multiplexer 10 and incident on the polarization separation element 3 by way of the port 11a and the port 11b of the light circulator 11. Then, the linearly polarized lights, in the x direction, of the pumped light and the signal light are separated along the optical axis Q1 by the polarization separation element 3, and are wavelength-converted to an output light polarized in the x direction by the wavelength conversion element 1 polarized in the x direction. On the other hand, the linearly polarized lights, in the y direction, of the pumped light and the signal light are separated along the optical axis Q2 by the polarization separation element 3, and after passing through the optical delay element 7, are wavelength-converted to an output light polarized in the y direction by the wavelength conversion element 2 polarized in the y direction.

The pumped lights, the signal lights and the output lights traveling from the wavelength conversion element 1 along the optical axes Q1 and Q2 are reflected at the reflecting mirror 20, and then, again pass through the same wavelength conversion elements 1 and 2 to be wavelength-converted. The pumped light, the signal light and the output light traveling along the optical axis Q1 enter the polarization separation element 3 as they are. The pumped light, the signal light and the output light traveling along the optical axis Q2 pass through the optical delay element 7, and then enter the polarization separation element 3.

The pumped lights, the signal lights and the output lights traveling along the optical axes Q1 and Q2 are multiplexed by the polarization separation element 3. The output lights are extracted by way of the port 11b and the port 11c of the light circulator 11.

Since the x-direction component is wavelength-converted on the optical axis Q1 and the y-direction component is wavelength-converted on the optical axis Q2 as described above, the composite intensity of the wavelength-converted output lights is constant, so that stable wavelength conversion not depending on the polarization condition of the signal light can be realized.

Figure 7:
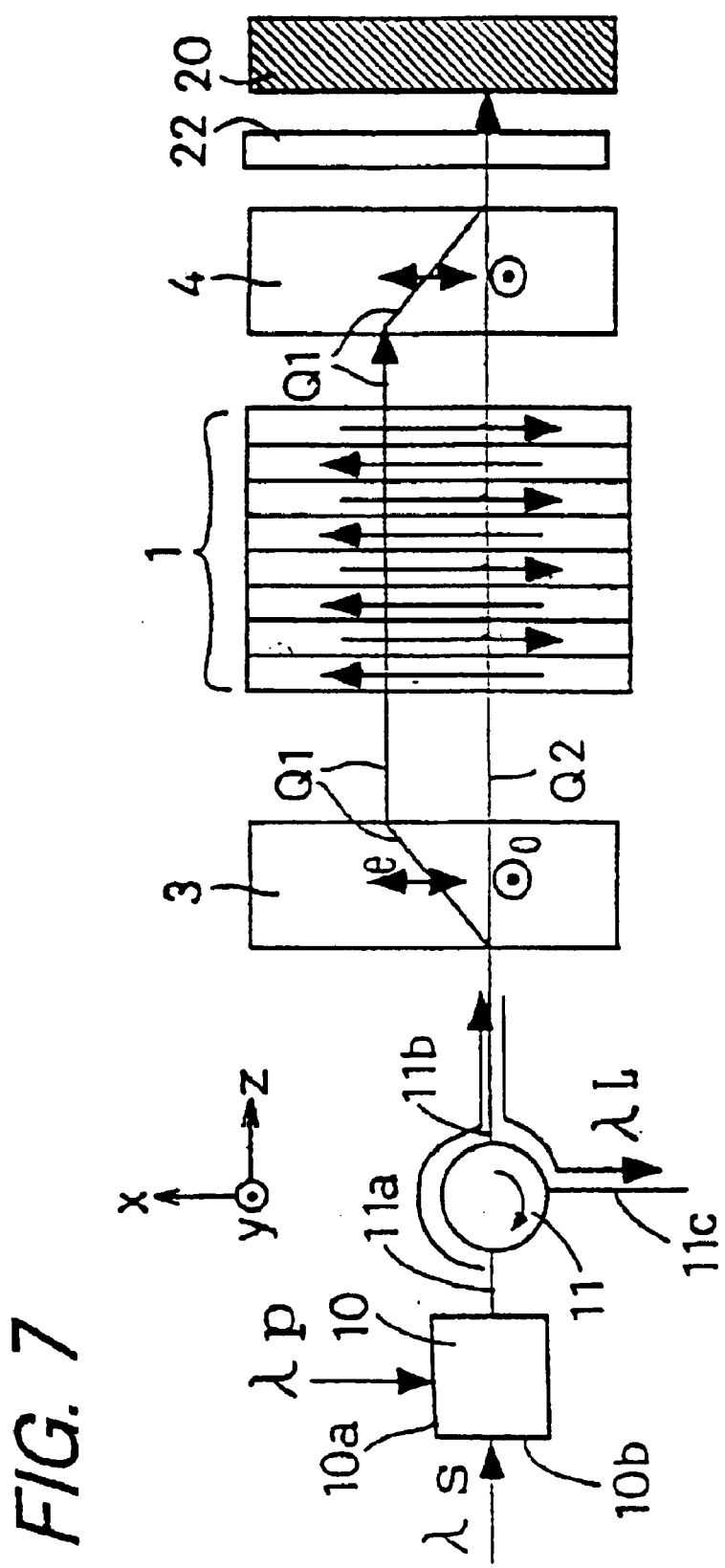
FIG. 7 is a block diagram showing a seventh embodiment of the invention.

FIG. 7 is a block diagram showing a seventh embodiment of the invention. The wavelength conversion apparatus includes a multiplexer 10, a light circulator 11, a polarization separation element 3, a wavelength conversion element 1, a polarization multiplexing element 4, a Faraday rotator 22, and a reflecting mirror 20.

The multiplexer 10 has an input port 10a to which pumped light (wavelength λp) is input and an input port 10b to which signal light (wavelength λs) is input. The multiplexer 10 multiplexes the pumped light and the signal light, and outputs the multiplexed lights along the same optical axis.

The light circulator 11 outputs the light input to a port 11a to a port 11b, and outputs the light input to the port 11b to a port 11c.

The wavelength conversion element 1 is made of a nonlinear optical material such as LN, LT, KN or KTP. In this embodiment, an example is shown that uses a QPM element whose polarization direction is alternately reversed at intervals of the coherence length. The wavelength conversion element 1 is disposed so that the polarization direction thereof is parallel to the x direction.

The polarization separation element 3 and the polarization multiplexing element 4 are made of a material such as a birefringent optical crystal cut obliquely with respect to the crystallographic axis (for example, YVO$_4$ cut in a direction at an angle of 45 degrees from the c axis), and have the function of, by a beam walk-off effect, separating an incident light into the linearly polarized light in the x direction which travels along the optical axis Q1, as extraordinary light e, and the linearly polarized light in the y direction which travels along the optical axis Q2, as ordinary light o, or multiplexing the linearly polarized light in the x direction incident along the optical axis Q1 and the linearly polarized light in the y direction incident along the optical axis Q2.

The Faraday rotator 22 rotates the polarization direction of light by 45 degrees about the optical axis in a predetermined direction. The reflecting mirror 20 reflects the incident light onto the same optical axis.

In cases where the conversion constant d33 of the nonlinear optical material is used in wavelength conversion, when the polarization direction of the wavelength conversion element, the polarization direction of the pumped light and the polarization direction of the signal light coincide with one another, a wavelength-converted output light (wavelength $\lambda L$) is generated in the same polarization direction.

For example, when wavelength conversion is performed in a 1.5-$\mu$m-band optical fiber communication by performing cascade difference frequency generation, the wavelength $\lambda s$ is set in the C band, the wavelength $\lambda L$ is set in the L band, and the wavelength $\lambda p$ is set to 1.56 $\mu$m at the midpoint between the C band and the L band. The relationship of the following equation (1) holds among the wavelength $\lambda p$ of the pumped light, the wavelength $\lambda s$ of the signal light and the wavelength $\lambda L$ of the output light:

$$1/\lambda L = 2/\lambda p - 1/\lambda s \tag{1}$$

Next, the operation will be described. For example, a linearly polarized light in which the ratio between the x-direction component and the y-direction component is 1:1 in the part where the light is incident on the polarization separation element 3, that is, a linearly polarized light rotated by 45 degrees with respect to the principal axis of the polarization separation element 3 is used as the pumped light. It is assumed that the polarization direction of the signal light varies with time and is uncertain.

The pumped light and the signal light are multiplexed by the multiplexer 10 and incident on the polarization separation element 3 by way of the port 11a and the port 11b of the light circulator 11. Then, the linearly polarized lights, in the x direction, of the pumped light and the signal light are separated along the optical axis Q1 by the polarization separation element 3, are wavelength-converted to an output light polarized in the x direction by the wavelength conversion element 1 polarized in the x direction, and enter the polarization multiplexing element 4. On the other hand, the linearly polarized lights, in the y direction, of the pumped light and the signal light are separated along the optical axis Q2 by the polarization separation element 3, and enter the polarization multiplexing element 4 without wavelength-converted by the wavelength conversion element 1.

The polarization multiplexing element 4 multiplexes the pumped lights, the signal lights and the output lights incident along the optical axes Q1 and Q2, and outputs the multiplexed lights along the same optical axes.

Then, the pumped lights, the signal lights and the output lights pass through the Faraday rotator 22, so that the polarization directions thereof are rotated by 45 degrees. Then, the lights are reflected at the reflecting mirror 20, and again pass through the Faraday rotator 22, so that the polarization directions thereof are further rotated by 45 degrees. With this, the polarization directions are rotated by 90 degrees with respect to the directions before the lights are incident on the Faraday rotator 22. When the lights are again incident on the polarization multiplexing element 4, the linearly polarized lights in the x direction are separated along the optical axis Q1, are wavelength-converted to an output light polarized in the x direction by the wavelength conversion element 1 polarized in the x direction, and enter the polarization separation element 3. The linearly polarized lights in the y direction are separated along the optical axis Q2, and enter the polarization separation element 3 without wavelength-converted by the wavelength conversion element 1.

The polarization separation element 3 multiplexes the pumped lights, the signal lights and the output lights incident along the optical axes Q1 and Q2, and outputs the multiplexed lights along the same optical axes.

The wavelength-converted output lights are extracted by way of the port 11b and the port 11c of the light circulator 11.

Since the x-direction component before input travels along the optical axis Q1 and the optical axis Q2 in this order and is wavelength-converted on the way to the reflecting mirror 20 and the y-direction component before input travels along the optical axis Q2 and the optical axis Q1 in this order and is wavelength-converted on the way back as described above, the composite intensity of the wavelength-converted output lights is constant, so that stable wavelength conversion not depending on the polarization condition of the signal light can be realized. Moreover, since the optical lengths through which the x-direction and the y-direction components before input pass are the same, influence of polarization mode dispersion (PMD) can be prevented.

Figure 8:
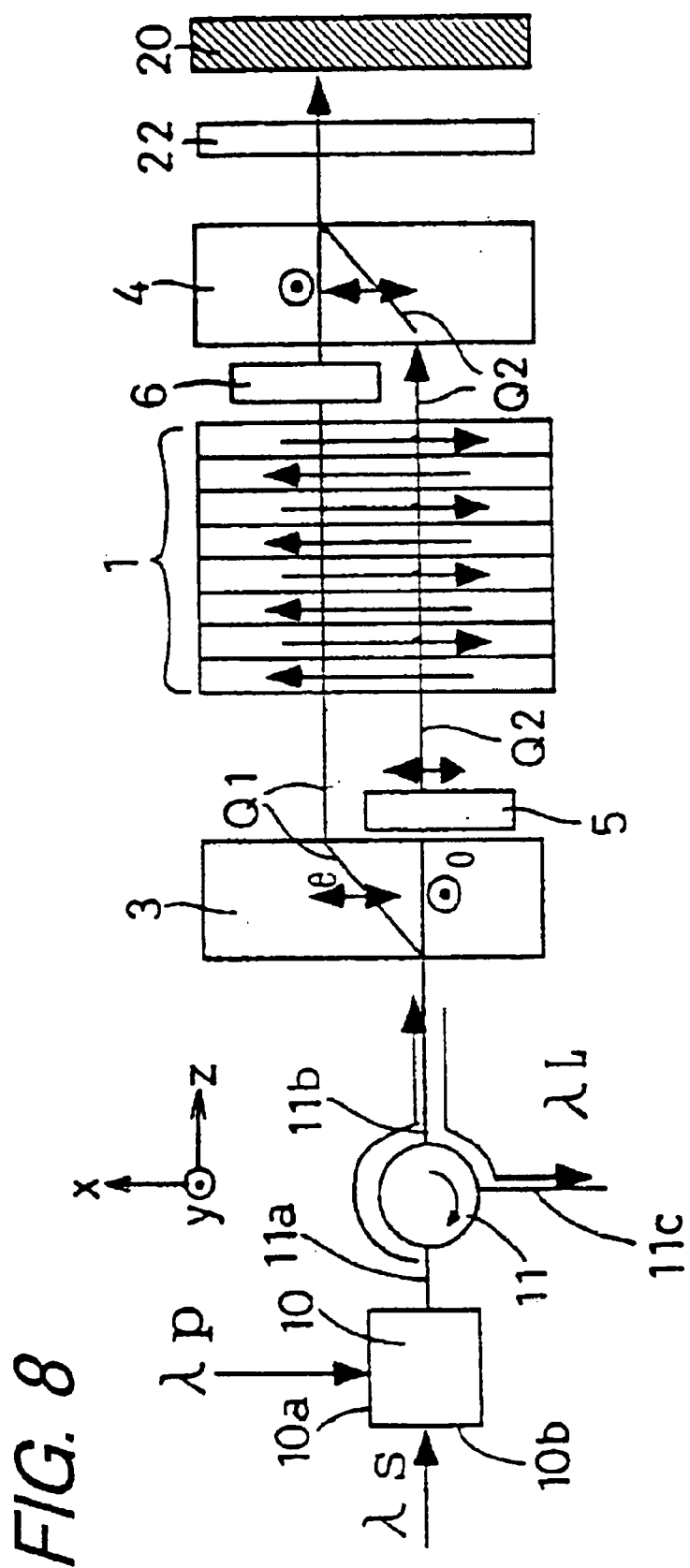
FIG. 8 is a block diagram showing an eighth embodiment of the invention.

FIG. 8 is a block diagram showing an eighth embodiment of the invention. The wavelength conversion apparatus includes a multiplexer 10, a light circulator 11, a polarization separation element 3, a wavelength conversion element 1, a polarization multiplexing element 4, 90-degree polarization rotating elements 5 and 6, a Faraday rotator 22, and a reflecting mirror 20.

The multiplexer 10 has an input port 10a to which pumped light (wavelength $\lambda p$) is input and an input port 10b to which signal light (wavelength $\lambda s$) is input. The multiplexer 10 multiplexes the pumped light and the signal light, and outputs the multiplexed lights along the same optical axis.

The light circulator 11 outputs the light input to a port 11a to a port 11b, and outputs the light input to the port 11b to a port 11c.

The wavelength conversion element 1 is made of a nonlinear optical material such as LN, LT, KN or KTP. In this embodiment, an example is shown that uses a QPM element whose polarization direction is alternately reversed at intervals of the coherence length. The wavelength conversion element 1 is disposed so that the polarization direction thereof is parallel to the x direction.

The polarization separation element 3 and the polarization multiplexing element 4 are made of a material such as a birefringent optical crystal cut obliquely with respect to the crystallographic axis (for example, $YVO_4$ cut in a direction at an angle of 45 degrees from the c axis), and have the function of, by a beam walk-off effect, separating an incident light into the linearly polarized light in the x direction which travels along the optical axis Q1, as extraordinary light e, and the linearly polarized light in the y direction which travels along the optical axis Q2, as ordinary light o, or multiplexing the linearly polarized light in the x direction incident along the optical axis Q1 and the linearly polarized light in the y direction incident along the optical axis Q2.

The 90-degree polarization rotating elements 5 and 6 comprise half-wave plates or the like, and have the function of rotating the polarization direction of the incident light by 90 degrees.

The Faraday rotator 22 rotates the polarization direction of light by 45 degrees about the optical axis in a predetermined direction. The reflecting mirror 20 reflects the incident light onto the same optical axis.

In cases where the conversion constant d33 of the non-linear optical material is used in wavelength conversion, when the polarization direction of the wavelength conversion element, the polarization direction of the pumped light and the polarization direction of the signal light coincide with one another, a wavelength-converted output light (wavelength λL) is generated in the same polarization direction.

For example, when wavelength conversion is performed in a 1.5-μm-band optical fiber communication by performing cascade difference frequency generation, the wavelength λs is set in the C band, the wavelength λL is set in the L band, and the wavelength λp is set to 1.56 μm at the midpoint between the C band and the L band. The relationship of the following equation (1) holds among the wavelength λp of the pumped light, the wavelength λs of the signal light and the wavelength λL of the output light:

$$1/\lambda L = 2/\lambda p - 1/\lambda s \tag{1}$$

Next, the operation will be described. For example, a linearly polarized light in which the ratio between the x-direction component and the y-direction component is 1:1 in the part where the light is incident on the polarization separation element 3, that is, a linearly polarized light rotated by 45 degrees with respect to the principal axis of the polarization separation element 3 is used as the pumped light. It is assumed that the polarization direction of the signal light varies with time and is uncertain.

The pumped light and the signal light are multiplexed by the multiplexer 10 and incident on the polarization separation element 3 by way of the port 11a and the port 11b of the light circulator 11. Then, the linearly polarized lights, in the x direction, of the pumped light and the signal light are separated along the optical axis Q1 by the polarization separation element 3, are wavelength-converted to an output light polarized in the x direction by the wavelength conversion element 1 polarized in the x direction, are converted to a linearly polarized light in the y direction by the 90-degree polarization rotating element 6, and then enter the polarization multiplexing element 4. On the other hand, the linearly polarized lights, in the y direction, of the pumped light and the signal light are separated along the optical axis Q2 by the polarization separation element 3, are converted to a linearly polarized light in the x direction by the 90-degree polarization rotating element 5, are wavelength-converted to an output light polarized in the x direction by the wavelength conversion element 1, and then enter the polarization multiplexing element 4.

The polarization multiplexing element 4 multiplexes the pumped lights, the signal lights and the output lights incident along the optical axes Q1 and Q2, and outputs the multiplexed lights along the same optical axes.

Then, the pumped lights, the signal lights and the output lights pass through the Faraday rotator 22, so that the polarization directions thereof are rotated by 45 degrees. Then, the lights are reflected at the reflecting mirror 20, and again pass through the Faraday rotator 22, so that the polarization directions thereof are further rotated by 45 degrees. With this, the polarization directions are rotated by 90 degrees with respect to the directions before the lights are incident on the Faraday rotator 22. When the lights are again incident on the polarization multiplexing element 4, the linearly polarized lights in the x direction are separated along the optical axis Q2, are wavelength-converted to an output light polarized in the x direction by the wavelength conversion element 1 polarized in the x direction, are converted to a linearly polarized light in the y direction by the 90-degree polarization rotating element 5, and enter the polarization separation element 3. The linearly polarized lights in the y direction are separated along the optical axis Q1, are converted to a linearly polarized light in the x direction by the 90-degree polarization rotating element 5, are wavelength-converted to an output light polarized in the x direction by the wavelength conversion element 1, and enter the polarization separation element 3.

The polarization separation element 3 multiplexes the pumped lights, the signal lights and the output lights incident along the optical axes Q1 and Q2, and outputs the multiplexed lights along the same optical axes.

The wavelength-converted output lights are extracted by way of the port 11b and the port 11c of the light circulator 11.

Since the x-direction component before input travels along the optical axis Q1 and the optical axis Q2 in this order and is wavelength-converted on the way to the reflecting mirror 20 and the y-direction component before input travels along the optical axis Q2 and the optical axis Q1 in this order and is wavelength-converted on the way back as described above, the composite intensity of the wavelength-converted output lights is constant, so that stable wavelength conversion not depending on the polarization condition of the signal light can be realized. Moreover, since the optical lengths through which the x-direction and the y-direction components before input pass are the same, influence of polarization mode dispersion (PMD) can be prevented.

Figure 9:
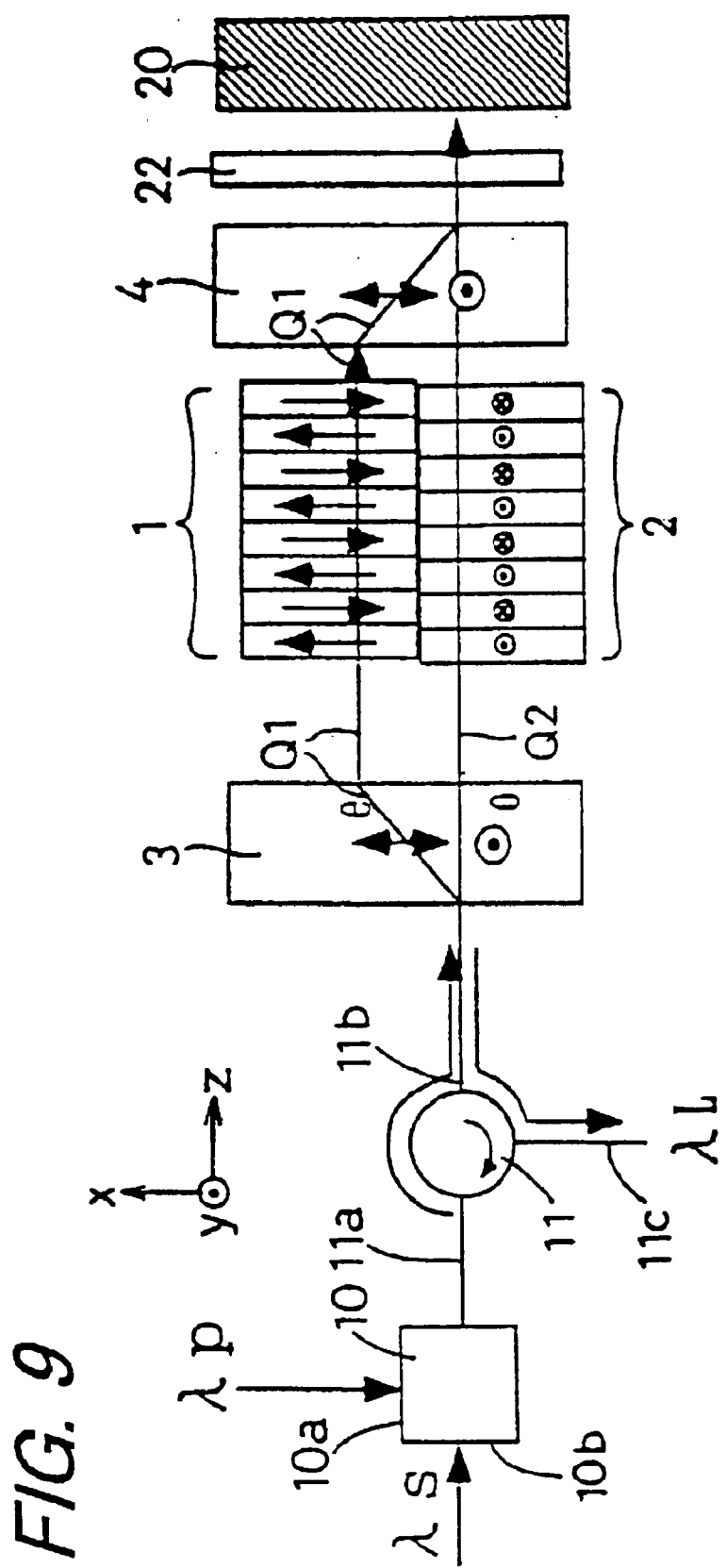
FIG. 9 is a block diagram showing a ninth embodiment of the invention.

FIG. 9 is a block diagram showing a ninth embodiment of the invention. The wavelength conversion element includes a multiplexer 10, a light circulator 11, a polarization separation device 3, wavelength conversion elements 1 and 2, a polarization multiplexing element 4, a Faraday rotator 22, and a reflecting mirror 20.

The multiplexer 10 has an input port 10a to which pumped light (wavelength λp) is input and an input port 10b to which signal light (wavelength λs) is input. The multiplexer 10 multiplexes the pumped light and the signal light, and outputs the multiplexed lights along the same optical axis.

The light circulator 11 outputs the light input to a port 11a to a port 11b, and outputs the light input to the port 11b to a port 11c.

The wavelength conversion elements 1 and 2 are made of a nonlinear optical material such as LN, LT, KN or KTP. In this embodiment, an example is shown that uses QPM elements whose polarization directions are alternately reversed at intervals of the coherence length. The wavelength conversion element 1 is disposed so that the polarization direction thereof is parallel to the x direction. The wavelength conversion element 2 is disposed so that the polarization direction thereof is parallel to the y direction.

The polarization separation element 3 and the polarization multiplexing element 4 are made of a material such as a birefringent optical crystal cut obliquely with respect to the crystallographic axis (for example, YVO$_4$ cut in a direction at an angle of 45 degrees from the c axis), and have the function of, by a beam walk-off effect, separating an incident light into the linearly polarized light in the x direction which travels along the optical axis Q1, as extraordinary light e, and the linearly polarized light in the y direction which travels along the optical axis Q2, as ordinary light o, or multiplexing the linearly polarized light in the x direction incident along the optical axis Q1 and the linearly polarized light in the y direction incident along the optical axis Q2.

The Faraday rotator 22 rotates the polarization direction of light by 45 degrees about the optical axis in a predetermined direction. The reflecting mirror 20 reflects the incident light onto the same optical axis.

In cases where the conversion constant d33 of the non-linear optical material is used in wavelength conversion, when the polarization direction of the wavelength conversion element, the polarization direction of the pumped light and the polarization direction of the signal light coincide with one another, a wavelength-converted output light (wavelength λL) is generated in the same polarization direction.

For example, when wavelength conversion is performed in a 1.5-μm-band optical fiber communication by performing cascade difference frequency generation, the wavelength λs is set in the C band, the wavelength λL is set in the L band, and the wavelength λp is set to 1.56μm at the midpoint between the C band and the L band. The relationship of the following equation (1) holds among the wavelength λp of the pumped light, the wavelength λs of the signal light and the wavelength λL of the output light:

$$1/\lambda L = 2/\lambda p - 1/\lambda s \tag{1}$$

Next, the operation will be described. For example, a linearly polarized light in which the ratio between the x-direction component and the y-direction component is 1:1 in the part where the light is incident on the polarization separation element 3, that is, a linearly polarized light rotated by 45 degrees with respect to the principal axis of the polarization separation element 3 is used as the pumped light. It is assumed that the polarization direction of the signal light varies with time and is uncertain.

The pumped light and the signal light are multiplexed by the multiplexer 10 and incident on the polarization separation element 3 by way of the port 11a and the port 11b of the light circulator 11. Then, the linearly polarized lights, in the x direction, of the pumped light and the signal light are separated along the optical axis Q1 by the polarization separation element 3, are wavelength-converted to an output light polarized in the x direction by the wavelength conversion element 1 polarized in the x direction, and enter the polarization multiplexing element 4. On the other hand, the linearly polarized lights, in the y direction, of the pumped light and the signal light are separated along the optical axis Q2 by the polarization separation element 3, are wavelength-converted to an output light polarized in the y direction by the wavelength conversion element 2 polarized in the y direction, and enter the polarization multiplexing element 4.

The polarization multiplexing element 4 multiplexes the pumped lights, the signal lights and the output lights incident along the optical axes Q1 and Q2, and outputs the multiplexed lights along the same optical axes.

Then, the pumped lights, the signal lights and the output lights pass through the Faraday rotator 22, so that the polarization directions thereof are rotated by 45 degrees. Then, the lights are reflected at the reflecting mirror 20, and again pass through the Faraday rotator 22, so that the polarization directions thereof are further rotated by 45 degrees. With this, the polarization directions are rotated by 90 degrees with respect to the directions before the lights are incident on the Faraday rotator 22. When the lights are again incident on the polarization multiplexing element 4, the linearly polarized lights in the x direction are separated along the optical axis Q1, are wavelength-converted to an output light polarized in the x direction by the wavelength conversion element 1 polarized in the x direction, and enter the polarization separation element 3. The linearly polarized lights in the y direction are separated along the optical axis Q2, are wavelength-converted to an output light polarized in the y direction by the wavelength conversion element 2, and enter the polarization separation element 3.

The polarization separation element 3 multiplexes the pumped lights, the signal lights and the output lights incident along the optical axes Q1 and Q2, and outputs the multiplexed lights along the same optical axes.

The wavelength-converted output lights are extracted by way of the port 11b and the port 11c of the light circulator 11.

Since the x-direction component before input travels along the optical axis Q1 and the optical axis Q2 in this order and is wavelength-converted on both ways and the y-direction component before input travels along the optical axis Q2 and the optical axis Q1 in this order and is wavelength-converted on both ways as described above, the composite intensity of the wavelength-converted output lights is constant, so that stable wavelength conversion not depending on the polarization condition of the signal light can be realized. Moreover, since the optical lengths through which the x-direction and the y-direction components before input pass are the same, influence of polarization mode dispersion (PMD) can be prevented.

Referring to the drawings, like or corresponding parts of the embodiments as shown in FIGS. 1 through 9 are designated by like reference characters.

In FIGS. 1, 2, 7, 8 and 9, similar effects are obtained when the Faraday rotator 22 is replaced by a λ/4 plate.

The invention may be embodied in other specific forms without departing from the spirit or essential characteristics thereof. the present embodiment are therefore to be considered in all respect as illustrative and not restrictive, the scope of the invention being indicated by the appended claims rather than by the foregoing description and all changes which come within the meaning and the range of equivalency of the claims are therefore intended to be embraced therein.

What is claimed is:

1. A wavelength conversion apparatus comprising:
   a wavelength conversion element for carrying out wavelength conversion of a linearly polarized light component in a first direction; and
   polarization rotating means, including a reflecting element for reflecting light having passed through the wavelength conversion element to return the light to the wavelength conversion element, for making a polarization direction difference of 90 degrees between a light before traveling to the polarization rotating means and a reflected light after traveling through the polarization rotating means.

2. The wavelength conversion apparatus of claim 1, further comprising:
   a wavelength selection reflecting element, disposed between the wavelength conversion element and the polarization rotating means, for selectively reflecting a pumped light.

3. The wavelength conversion apparatus of claim 2, wherein the polarization rotating means comprises a 45-degree rotating element for rotating a polarization direction of light by 45 degrees and the reflecting element for reflecting a light having passed through the 45-degree polarization rotating element to return the light to the 45-degree polarization rotating element, and the 45-degree rotating element is disposed between the wavelength conversion element and the reflecting element.

4. The wavelength conversion apparatus of claim 2, wherein the polarization rotating means comprises:
   a λ/4 plate disposed between the reflecting element and the wavelength conversion element; and
   the reflecting element.

5. The wavelength conversion apparatus of claim 1, wherein the polarization rotating means comprises a 45-degree rotating element for rotating a polarization direction of light by 45 degrees and the reflecting element for reflecting a light having passed through the 45-degree polarization rotating element to return the light to the 45-degree polarization rotating element, and the 45-degree rotating element is disposed between the wavelength conversion element and the reflecting element.

6. The wavelength conversion apparatus of claim 1, wherein the polarization rotating means comprises:
- a $\lambda/4$ plate disposed between the reflecting element and the wavelength conversion element; and
- the reflecting element.

7. A wavelength conversion apparatus comprising:
- a polarization separation element made of a birefringent optical crystal for separating an incident light into a linearly polarized light in a first direction and a linearly polarized light in a second direction perpendicular to the first direction so that the linearly polarized light in the first direction travels along a first optical axis and the linearly polarized light in the second direction travels along a second optical axis;
- a first 90-degree polarization rotating element for rotating by 90 degrees a polarization direction of a light traveling from the polarization separation element along the second optical axis;
- a wavelength conversion element for wavelength-converting linearly polarized light components in the first direction with respect to a light traveling from the polarization separation element along the first optical axis and a light traveling from the first 90-degree polarization rotating element along the second optical axis;
- a second 90-degree polarization rotating element for rotating by 90 degrees a polarization direction of a light traveling from the wavelength conversion element along the first optical axis; and
- a polarization multiplexing element made of a birefringent optical crystal for multiplexing a light traveling from the second 90-degree polarization rotating element along the first optical axis and a tight traveling from the wavelength conversion element along the second optical axis.

8. A wavelength conversion apparatus comprising:
- a polarization separation element made of a birefringent optical crystal for separating an incident light into a linearly polarized light in a first direction and a linearly polarized light in a second direction perpendicular to the first direction so that the linearly polarized light in the first direction travels along a first optical axis and the linearly polarized light in the second direction travels along a second optical axis;
- a first wavelength conversion element for wavelength-converting a linearly polarized light component in the first direction, with respect to the light traveling from the polarization separation element along the first optical axis;
- a second wavelength conversion element for wavelength-converting a linearly polarized light component in the second direction, with respect to a light traveling from the polarization separation element along the second optical axis; and
- a polarization multiplexing element made of a birefringent optical crystal for multiplexing a light having passed through the first wavelength conversion element and a light having passed through the second wavelength conversion element.

9. A wavelength conversion apparatus comprising:
- a polarization separation element for separating an incident light into a linearly polarized light in a first direction and a linearly polarized light in a second direction perpendicular to the first direction so that the linearly polarized light in the first direction travels along a first optical axis and the linearly polarized light in the second direction travels along a second optical axis;
- a 90-degree polarization rotating element for rotating by 90 degrees a polarization direction of a light traveling from the polarization separation element along the second optical axis;
- a wavelength conversion element for wavelength-converting linearly polarized light components in the first direction, with respect to the light traveling from the polarization separation element along the first optical axis and the light traveling from the 90-degree polarization rotating element along the second optical axis; and
- a reflecting element for reflecting light traveling from the wavelength conversion element along the first optical axis and the second optical axis so that the light along the first optical axis passes through the wavelength conversion element, the light along the second optical axis passes through the wavelength conversion element and the 90-degree polarization rotating element in this order and these light are multiplexed by the polarization separation element.

10. A wavelength conversion apparatus comprising:
- a polarization separation element made of a birefringent optical crystal for separating an incident light into a linearly polarized light in a first direction and a linearly polarized light in a second direction perpendicular to the first direction so that the linearly polarized light in the first direction travels along a first optical axis and the linearly polarized light in the second direction travels along a second optical axis;
- a first wavelength conversion element for wavelength-converting a linearly polarized light component in the first direction, with respect to the light traveling from the polarization separation element along the first optical axis;
- a second wavelength conversion element for wavelength-converting a linearly polarized light component in the second direction, with respect to the light traveling from the polarization separation element along the second optical axis; and
- a reflecting element for reflecting a light traveling from the first wavelength conversion element along the first optical axis and a light traveling from the second wavelength conversion element along the second optical axis so that a light having passed through the first wavelength conversion element and a light having passed through the second wavelength conversion element are multiplexed by the polarization separation element.

11. A wavelength conversion apparatus comprising:
- a polarization separation element made of a birefringent optical crystal for separating an incident light into a linearly polarized light in a first direction and a linearly polarized light in a second direction perpendicular to the first direction so that the linearly polarized light in the first direction travels along a first optical axis and the linearly polarized light in the second direction travels along a second optical axis;

a wavelength conversion element for wavelength-converting a linearly polarized light component in the first direction, with respect to the light traveling from the polarization separation element along the first optical axis;

a polarization multiplexing element made of a birefringent optical crystal for multiplexing a light traveling from the wavelength conversion element along the first optical axis and a light traveling from the polarization separation element along the second optical axis; and polarization rotating means including a reflecting element for reflecting a light having passed through the polarization multiplexing element to return the light to the wavelength conversion element, for making a polarization direction difference of 90 degrees between a light before traveling to the polarization rotating means and a reflected light after traveling through the polarization rotating means.

12. The wavelength conversion apparatus of claim 11, wherein the polarization rotating means comprises a 45-degree rotating element for rotating a polarization direction of light by 45 degrees and the reflecting element for reflecting a light having passed through the 45-degree polarization rotating element to return the light to the 45-degree polarization rotating element, and the 45-degree rotating element is disposed between the wavelength conversion element and the reflecting element.

13. The wavelength conversion apparatus of claim 11, wherein the polarization rotating means comprises:

a λ/4 plate disposed between the reflecting element and the wavelength conversion element; and the reflecting element.

14. A wavelength conversion apparatus comprising:

a polarization separation element made of a birefringent optical crystal for separating an incident light into a linearly polarized light in a first direction and a linearly polarized light in a second direction perpendicular to the first direction so that the linearly polarized light in the first direction travels along a first optical axis and the linearly polarized light in the second direction travels along a second optical axis;

a first 90-degree polarization rotating element for rotating by 90 degrees a polarization direction of a light traveling from the polarization separation element along the second optical axis;

a wavelength conversion element for wavelength-convening linearly polarized light components in the first direction, with respect to a light traveling from the polarization separation element along the first optical axis and a light traveling from the first 90-degree polarization rotating element along the second optical axis;

a second 90-degree polarization rotating element for rotating by 90 degrees a polarization direction of a light traveling from the wavelength conversion element along the first optical axis;

a polarization multiplexing element made of a birefringent optical crystal for multiplexing a light traveling from the second 90-degree polarization rotating element along the first optical axis and a light traveling from the wavelength conversion element along the second optical axis; and polarization rotating means including a reflecting element for reflecting a light having passed through the polarization multiplexing element to return the light to the wavelength conversion element, for making a polarization direction difference of 90 degrees between a light before traveling to the polarization rotating means and a reflected light after traveling through the polarization rotating means.

15. The wavelength conversion apparatus of claim 14, wherein the polarization rotating means comprises a 45-degree rotating element for rotating a polarization direction of light by 45 degrees and the reflecting element for reflecting a light having passed through the 45-degree polarization rotating element to return the light to the 45-degree polarization rotating element, and the 45-degree rotating element is disposed between the wavelength conversion element and the reflecting element.

16. The wavelength conversion apparatus of claim 14, wherein the polarization rotating means comprises:

a λ/4 plate disposed between the reflecting element and the wavelength conversion element; and the reflecting element.

17. A wavelength conversion apparatus comprising:

a polarization separation element made of a birefringent optical crystal for separating an incident light into a linearly polarized light in a first direction and a linearly polarized light in a second direction perpendicular to the first direction so that the linearly polarized light in the first direction travels along a first optical axis and the linearly polarized light in the second direction travels along a second optical axis;

a first wavelength conversion element for wavelength-converting a linearly polarized light component in the first direction, with respect to a light traveling from the polarization separation element along the first optical axis;

a second wavelength conversion element for wavelength-converting a linearly polarized light component in the second direction, with respect to a light traveling from the polarization separation element along the second optical axis;

a polarization multiplexing element made of a birefringent optical crystal for multiplexing a light traveling from the first wavelength conversion element along the first optical axis and a light traveling from the second wavelength conversion element along the second optical axis; and polarization rotating means including a reflecting element for reflecting a light having passed through the polarization multiplexing element to return the light to the wavelength conversion elements, for making a polarization direction difference of 90 degrees between a light before traveling to the polarization rotating means and a reflected light after traveling through the polarization rotating means.

18. The wavelength conversion apparatus of claim 17, wherein the polarization rotating means comprises a 45-degree rotating element for rotating a polarization direction of light by 45 degrees and the reflecting element for reflecting a light having passed through the 45-degree polarization rotating element to return the light to the 45-degree polarization rotating element, and the 45-degree rotating element is disposed between the wavelength conversion elements and the reflecting element.

19. The wavelength conversion apparatus of claim 17, wherein the polarization rotating means comprises:

a λ/4 plate disposed between the reflecting element and the wavelength conversion elements; and the reflecting element.

* * * * *